(12) United States Patent
Quintana

(10) Patent No.: US 10,631,533 B2
(45) Date of Patent: Apr. 28, 2020

(54) PROTECTIVE GARMENT FOR ANIMALS

(71) Applicant: Leah Bernadette Quintana, Cedar Creek, TX (US)

(72) Inventor: Leah Bernadette Quintana, Cedar Creek, TX (US)

( * ) Notice: Subject to any disclaimer, the term of this patent is extended or adjusted under 35 U.S.C. 154(b) by 0 days.

(21) Appl. No.: 16/504,182

(22) Filed: Jul. 5, 2019

(65) Prior Publication Data

US 2019/0364877 A1 Dec. 5, 2019

Related U.S. Application Data

(63) Continuation-in-part of application No. 14/974,080, filed on Dec. 18, 2015, now Pat. No. 10,342,216.

(51) Int. Cl.
*A01K 13/00* (2006.01)
*A01M 29/10* (2011.01)
*A01M 29/08* (2011.01)

(52) U.S. Cl.
CPC ........... *A01M 29/10* (2013.01); *A01K 13/006* (2013.01); *A01M 29/08* (2013.01)

(58) Field of Classification Search
CPC ... A01K 13/006; A01K 27/002; A01M 29/00; A01M 29/06; A01M 29/08
See application file for complete search history.

(56) References Cited

U.S. PATENT DOCUMENTS

| | | | |
|---|---|---|---|
| 5,906,004 A * | 5/1999 | Lebby | A41D 31/00 139/425 R |
| 8,015,948 B2 | 9/2011 | Hall | |
| 9,370,166 B1 * | 6/2016 | Ford | A01K 27/002 |
| 10,231,433 B1 | 3/2019 | Caruso | |
| 2002/0098312 A1 * | 7/2002 | Sloot | A41D 13/01 428/45 |
| 2007/0281136 A1 * | 12/2007 | Hampden-Smith | B41M 1/22 428/195.1 |
| 2010/0277945 A1 * | 11/2010 | Hurwitz | A01K 13/003 362/570 |
| 2011/0155077 A1 * | 6/2011 | Hurwitz | A01K 13/006 119/850 |
| 2011/0203783 A1 * | 8/2011 | Blackford | A43B 1/00 165/185 |
| 2016/0262462 A1 * | 9/2016 | Kawamura | A01K 13/006 |

* cited by examiner

*Primary Examiner* — Kristin C Hayes
(74) *Attorney, Agent, or Firm* — J. Eric Churilla

(57) ABSTRACT

A protective garment for an animal is disclosed. The garment includes a body having a central portion, a first body flap extending from the central portion, and a second body flap extending from the central portion. The first body flap and the second body flap are extendable around a body of the animal and fasten to each other. The garment further includes a first collar flap extending from central portion and a second collar flap extending from the central portion. The first collar flap and the second collar flap are extendable around a neck of the animal and fasten to each other. Further, the central portion includes an outer surface that includes an array having a plurality of iridescent cells separated by a grid.

20 Claims, 18 Drawing Sheets

PROTECTIVE GARMENT FOR ANIMALS

REFERENCE TO RELATED APPLICATION

This application is a continuation-in-part of pending U.S. patent application Ser. No. 14/974,080, entitled "PROTECTIVE GARMENT FOR ANIMALS", by Leah Bernadette Quintana, filed Dec. 18, 2015.

BACKGROUND

Raptors are birds of prey. They are carnivorous birds with strong bills, large talons and exceptional flight capabilities that hunt small animals. There are more than five hundred species of raptors worldwide. Different species of raptors can be found in every type of habitat, from frozen tundra and scorching deserts to dense forests and bustling cities.

The Latin word "raptor" means "to plunder, snatch or seize". Raptors are characterized by a hooked beak, razor-sharp talons on strong feet and excellent eyesight. They hunt with their large strong talons and sharply hooked bills. Most raptors capture exclusively live prey. Large raptors will routinely attack animals that weigh up to twenty pounds as part of a hunt, and many birds of prey will attack even larger animals if the bird feels its nest or young is threatened. Even though animals heavier than twenty pounds cannot physically be picked up by most birds of prey small pets are often harmed or killed by birds attempting to take them.

Different types of raptors have varying ways to kill their prey. A hawk kills its prey with its claws as wile a falcon uses its claws to catch its prey but kills the small animal with its mouth instead of its claws. But all capture their prey with the talons on their powerful feet. Feet are often the primary weapons of death, and protection, for raptors. The talon on the back toe is long. The size of a raptors foot varies with the size of its prey: rodent hunters generally have short, stout toes, while bird hunters have long, thin toes to increase their grasping area. Their quite large and powerful feet can exert enough pressure to puncture thick skin, often crushing and killing prey instantly. Once a raptor catches something, the bird generally will not release it until the prey stops moving. For example, red-tailed hawk talons can apply up to two hundred pounds per square inch of pressure, whereas the average human hand can only apply about ninety pounds. A golden eagle that weighs about nine pounds with a seven foot wingspan can grip with its claws with an estimated strength of several hundred pounds per square inch. The spread of a golden eagle's feet is about nine inches.

In addition to their strong talons, birds of prey have extremely fast and precise dives that make it difficult if not impossible for an animal to avoid attack. Raptors are precision divers, swooping out of the sky onto their prey, and some raptors are even capable of hovering or agilely darting through foliage to capture their next meal. For example, eagles dive as fast as one hundred and fifty to two hundred miles per hour, falcons dive at over a hundred miles per hour and hawks dive at speeds up to one hundred and eighty miles an hour.

Raptors are relatively quiet when hunting since stealth is a part of their hunting tactics. Raptors may be active at any time of day or night, though owls are the most common nocturnal birds of prey while others are diurnal and will be most active when their preferred prey is active, making hunting easier Birds of prey have very keen eyesight. They locate and distinguish prey from a great distance. Only recently has it become known that birds possess more sophisticated color visual systems than we humans. While humans are trichromats, having photo-pigments with sensitivities at three peak wavelengths, birds have photo-pigments with sensitivities at four or five peak wavelengths, making them true tetrachromats, or perhaps even pentachromats. In some species, the visual spectrum extends into the ultraviolet range, once thought to be visible only to insects. It is as hard for humans to imagine how birds perceive color as it is for a colorblind person to imagine full color vision; it is outside of the human experience. For example, some species we see as having identical male and female plumage differ when seen in the ultraviolet range—a difference apparent to the birds themselves. This impacts the study of bird behavior, and our understanding of how birds of prey hunt prey for food.

As to their prey, they don't distinguish between a wild creature and a domestic pet. Therefore, for all these reasons pet owners fear for their pets when raptors are in the area.

SUMMARY

The present invention is a protective garment specifically designed based on a raptor's eyesight and hunting patterns. The protective garment, which may be in the form of a vest comprising a central portion with flaps extending from opposite dices of the central portion. The garment may be fastened together around the chest and stomach of the animal. A collar portion may be part of the garment to cover and protect the neck and perhaps part of the head. The garment may be single or multi-layered. But what is common is that the outer surface of the garment is made of a material that comprises an array having a plurality cells separated by a grid. Further, the material is reflective, iridescent and/or may be a holographic material applied to a fabric or other type of substrate. Because of the characteristics of the bird's eyesight, the reflective material confuses the bird and makes an animal that is wearing the garment such a small pet invisible to the raptor. In addition, for times of day when there is low light, such as cloudy days, dusk, dawn and nighttime, the garment has removably attached lights, such as LED lights, that illuminate the garment thereby activating the reflective or holographic material. The light reflected from the garment when it is naturally illuminated (during the time periods of sun shine or high light) and from the LED light illuminated garment is menacing to most birds of prey. In particular, the iridescent material and holographic material shimmer and shine either naturally illuminated or the LED light illuminated, causing the birds of prey to be disoriented and not see the pet as prey.

BRIEF DESCRIPTION OF DRAWINGS

These and other features, aspects and advantages of the system will become better understood with regards to the following description, appended claims and accompanying drawings wherein:

DETAILED DESCRIPTION

Before describing selected embodiments of the present disclosure in detail, it is to be understood that the present disclosure is not limited to the particular embodiments described herein. The disclosure and description herein is illustrative and explanatory of one or more presently preferred embodiments of the disclosure and variations thereof, and it will be appreciated by those skilled in the art that various changes in the design, organization, order of operation, means of operation, equipment structures and location, methodology, and use of mechanical equivalents may be made without departing from the spirit of the disclosure.

As well, it should be understood the drawings are intended to illustrate and plainly disclose presently preferred embodiments of the disclosure to one of skill in the art, but are not intended to be manufacturing level drawings or renditions of final products and may include simplified conceptual views as desired for easier and quicker understanding or explanation of the disclosure. As well, the relative size and arrangement of the components may differ from that shown and still operate within the spirit of the disclosure as described throughout the present application.

Moreover, it will be understood that various directions such as "upper", "lower", "bottom", "top", "left", "right", "horizontal", "vertical", "upward", "downward" and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Figure 2:
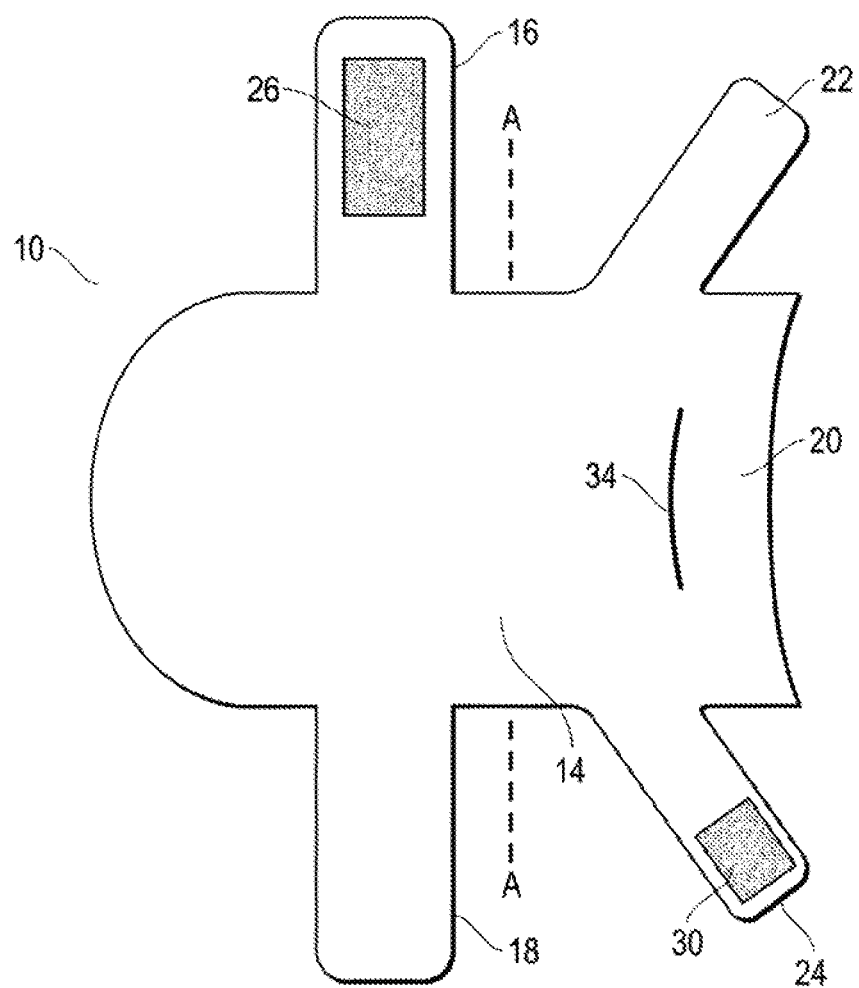
FIG. 2 is a top plan view of the first embodiment of the protective garment of FIG. 1.
Figure 3:
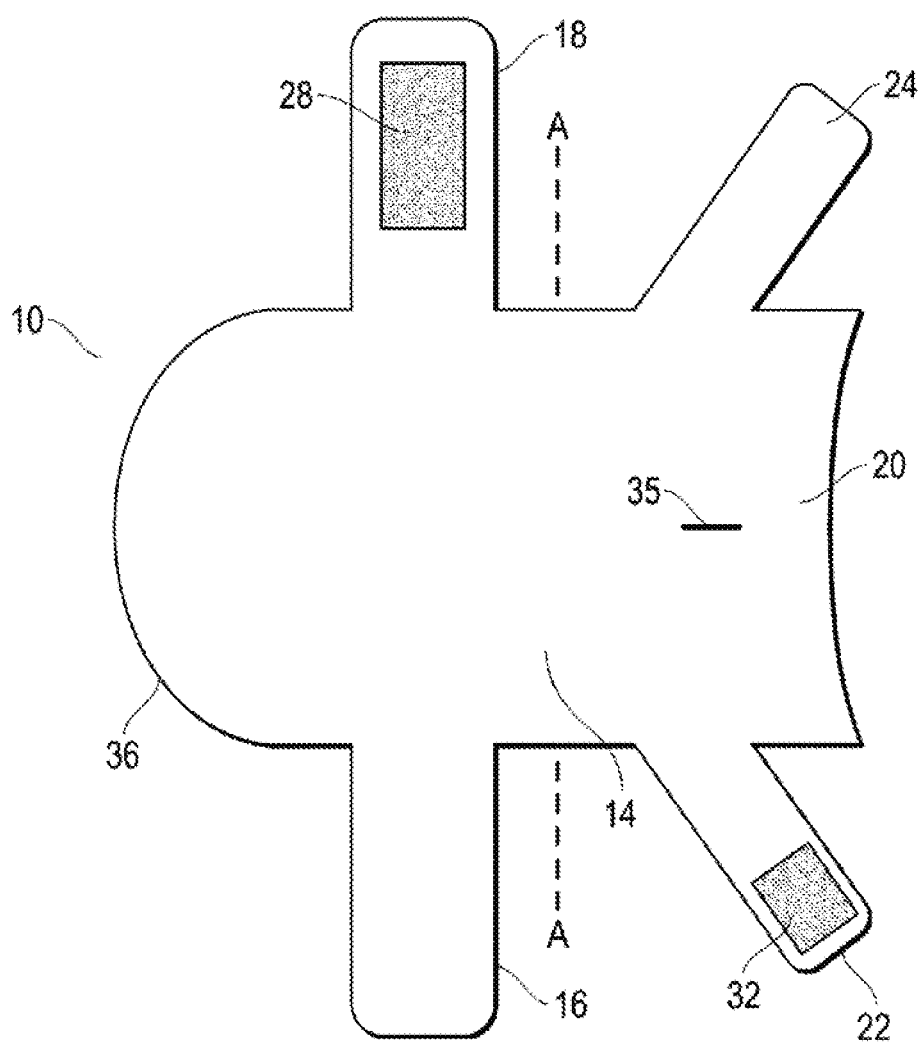
FIG. 3 is a bottom plan view of the first embodiment of the protective garment of FIG. 2.
Figure 4:
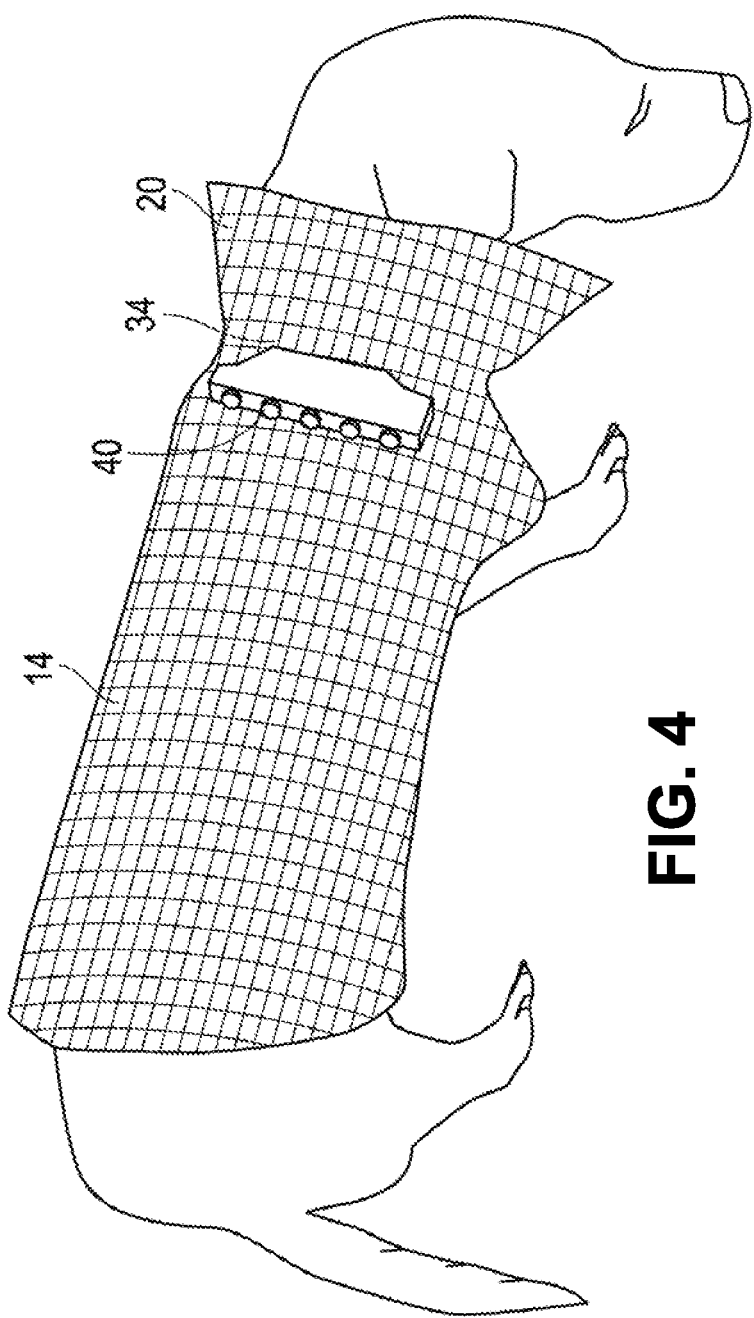
FIG. 4 is a top perspective view of the first embodiment of the protective garment worn by an exemplary animal.

Referring now the drawings, an embodiment of a protective garment 10 for an animal is shown in the figures. Although in FIGS. 1, 4 and 6 the garment is shown on a dog, the garment may be worn by many different types of animals with four legs, or two arms and two legs, including but not limited to cats. It could also be worn by pet birds, including but not limited to parrots or macaws. The embodiment of the garment 10, includes a central portion 14 designed to cover an animal's body and a left flap 16 and a right flap 18 extending from the central portion 14 approximately parallel to the longitudinal axis A-A and the straps being substantially perpendicular to the central portion 14 of the garment. When the garment is worn by an animal, the flaps 16 and 18 are designed to encircle an animal's body and secure the garment to the animal. The flaps have fasteners 26 and 28, which may be made of a fastening material such as Velcro® (VELCRO is a registered trademark of Velcro Industries B.V.) to secure the garment around the animal. A collar/neck piece 20 protrudes from one part of the central portion 14 and is designed to cover the neck of the animal when it is worn. A left collar flap 22 and a right collar flap 24 protrude from the respective ends of the collar piece 20. The collar flaps 22 and 24 have fasteners 30 and 32, which may be made of a fastening material such as Velcro to secure the garment around the neck of animal. In the exemplary embodiment shown in FIGS. 1, 2 and 3, the left flap 16 goes abound around the dog's back and stomach and the right flap 18 goes around the dog's back and stomach with the right flap 18 going over and removably attaching to the left strap 16 by means of the fasteners 26 and 28. In the exemplary embodiment shown in FIGS. 1 and 2, the left collar flap 22 goes around the dog's neck and the right collar flap 24 goes around the neck with the left collar flap 22 going over and removably attaching to the right collar strap 30 by means of the fasteners 24 and 32. There is no requirement that the fasteners be applied to the right or left side of the garment, that is, the location of fasteners may be reversed. As shown in FIG. 2, there is an opening 34 that forms a small pocket near the neck 20 of the garment that allows battery powered lights, such as LED lights, to be removably attached to the garment to illuminate the garment (as shown in FIG. 4, 40). As shown in FIG. 3, there is an opening 35 on the underside 36 of the garment that also forms a pocket that holds the lights.

Figure 1:
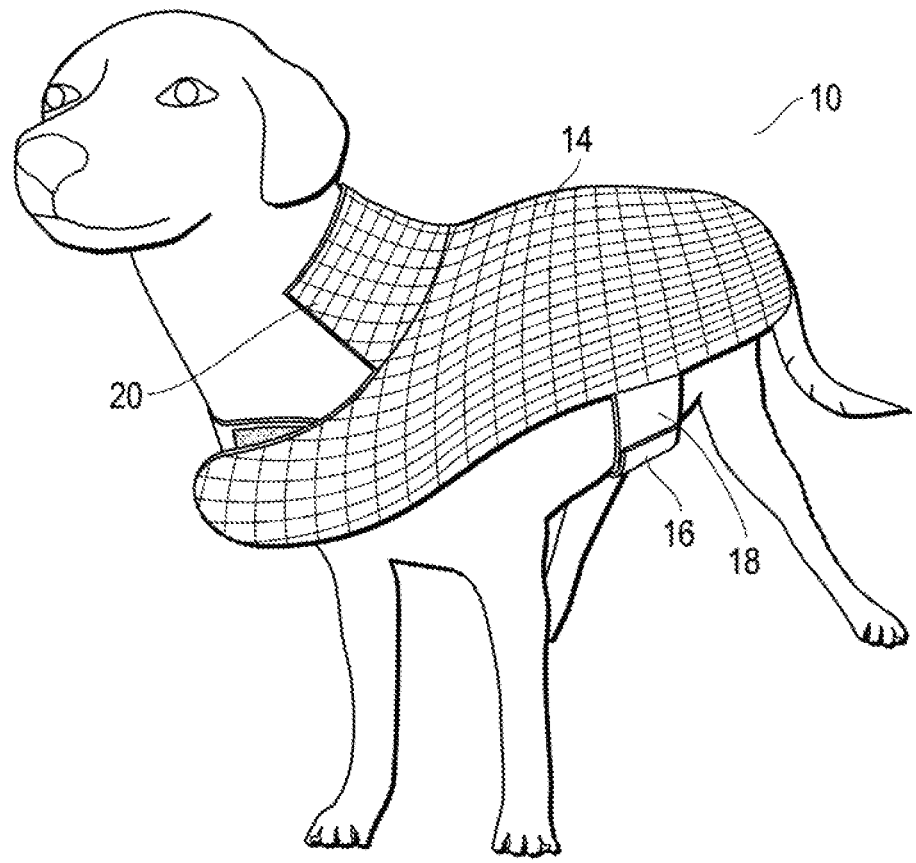
FIG. 1 is a perspective view of a first embodiment of a protective garment for an animal worn by an exemplary animal.
Figure 5:
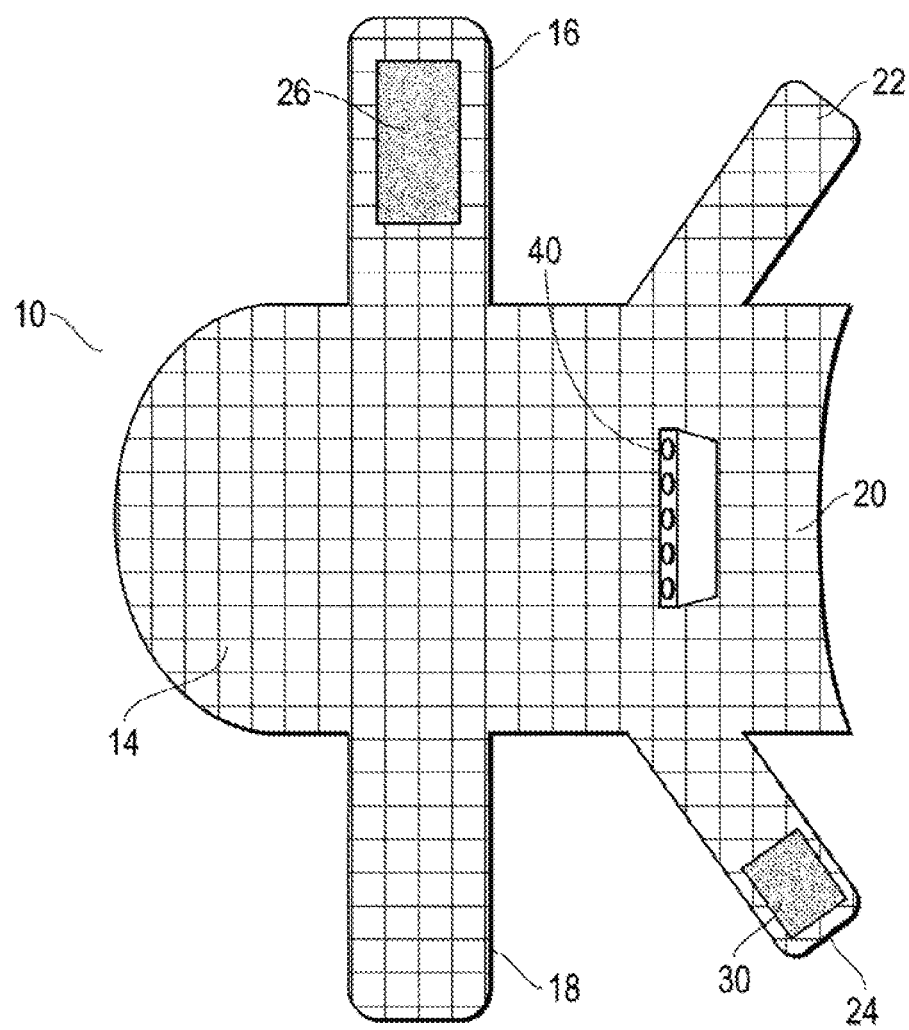
FIG. 5 a top plan view of a first embodiment of the protective garment of FIG. 1.

FIG. 5 shows FIG. 5 a top plan view of a first embodiment of the protective garment of FIG. 1 shown with the removable battery powered lights 40.

Figure 6:
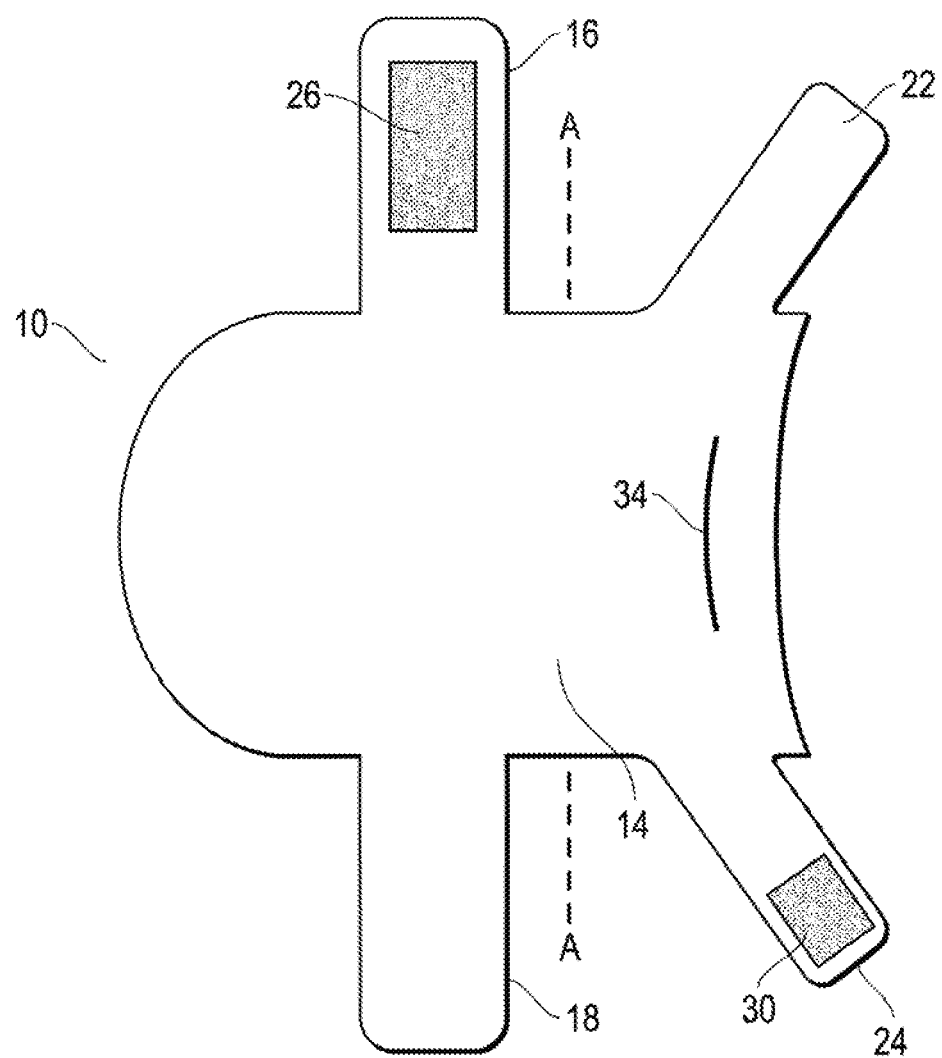
FIG. 6 is a top plan view of a second embodiment of a protective garment for an animal.

FIG. 6 is a top plan view of a second embodiment of the protective garment.

Figure 7:
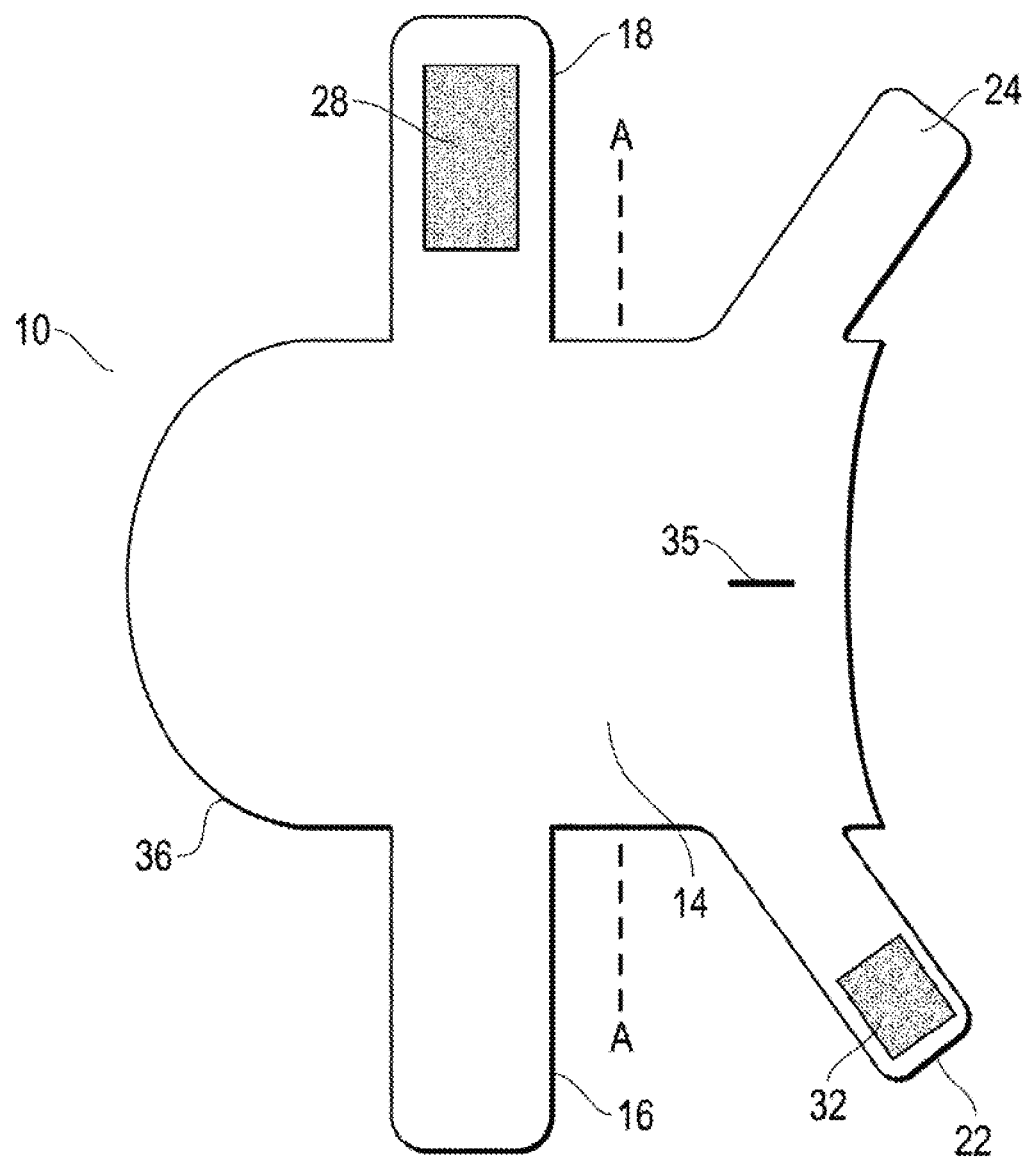
FIG. 7 is a bottom plan view of the second embodiment of the protective garment for an animal.

FIG. 7 is a bottom plan view of a second embodiment of the protective garment of FIG. 6.

As shown in FIGS. 6 and 7, the flaps have fasteners 26 and 28, which may be made of a fastening material such as Velcro® (VELCRO is a registered trademark of Velcro Industries B.V.) to secure the garment around the animal. A left collar flap 22 and a right collar flap 24 protrude from the respective ends of the body 14 of the garment. The collar flaps 22 and 24 have fasteners 30 and 32, which may be made of a fastening material such as Velcro to secure the garment around the neck of animal.

Figure 8:
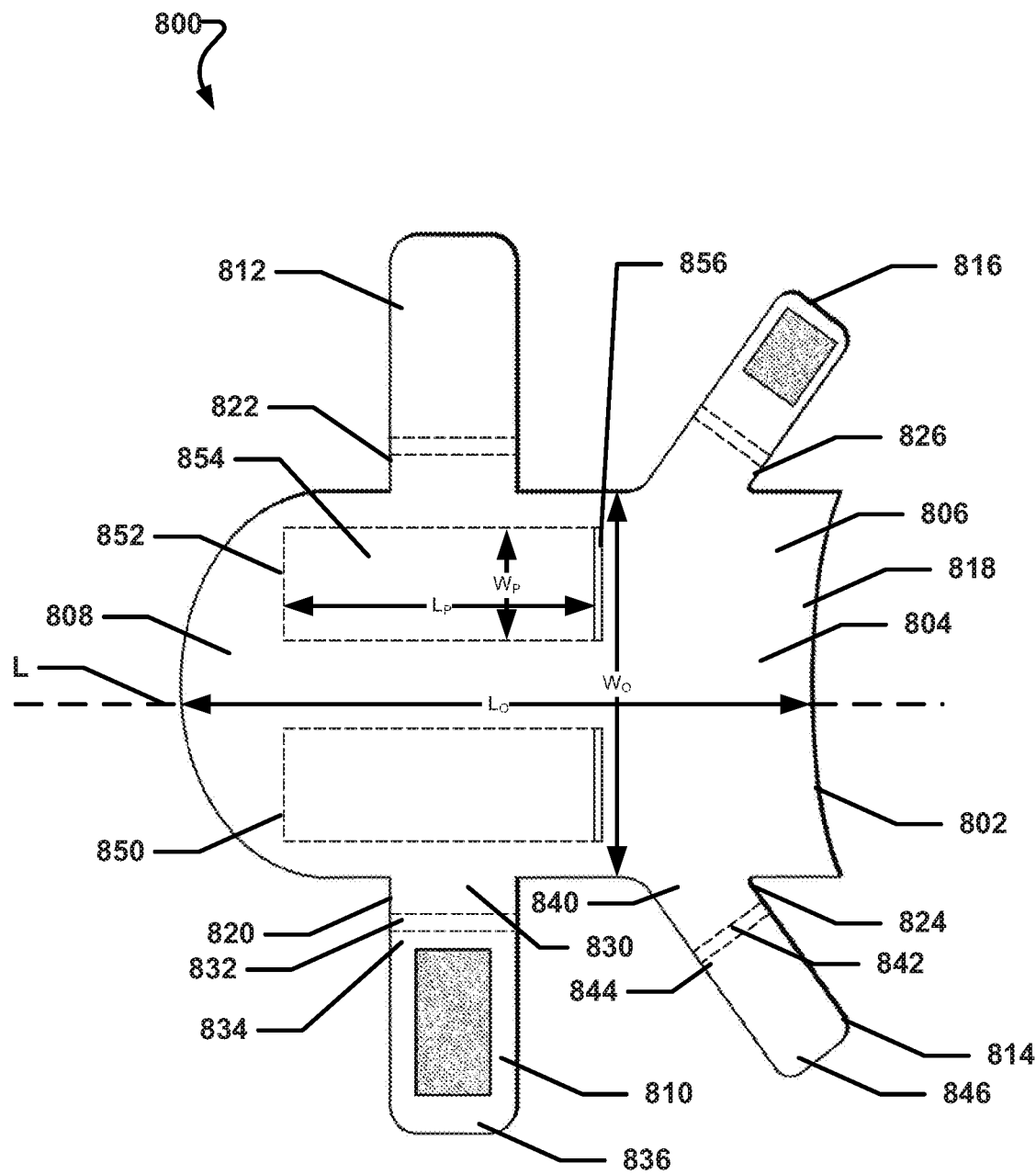
FIG. 8 is a first bottom plan view of a third embodiment of a protective garment for an animal.

Referring now to FIG. 8 through FIG. 16, a third embodiment of a protective garment for an animal is illustrated and is generally designated 800. As shown in FIG. 8, the protective garment 800 can include a body 802 having a central portion 804. The central portion 804 can include a leading end 806 and a trailing end 808. In a particular aspect, when the protective garment 800 is worn by an animal, e.g., a dog, as depicted in FIG. 17, the leading end 806 of the central portion 804 of the body 802 of the protective garment 800 can be near or adjacent to the animal's head. Further, the trailing end 808 of the central portion 804 of the body 802 of the protective garment 800 can be near or adjacent to the animal's hind quarters.

As indicated in FIG. 8, the protective garment 800 can include a left body flap 810 and a right body flap 812 that can extend from the central portion 804 of the body 802 between a midpoint of the central portion 804 of the body 802 of the protective garment 800 and the trailing end 808 of the body 802 of the protective garment 800. The left body flap 810 can extend in a first direction that is substantially perpendicular to a longitudinal axis, L, of the protective garment 800. The right body flap 812 can extend in a second direction that is opposite the first direction and is also substantially perpendicular to longitudinal axis, L.

Further, the protective garment 800 can include a left collar flap 814 and a right collar flap 816 that can extend from the central portion 804 of the body 802 at or near the leading end 806 of the body 802 of the protective garment 800. The left collar flap 814 can extend in a first direction at an angle with respect to the longitudinal axis, L. The right collar flap 816 can extend in a second direction opposite the first direction that is also at angle with respect to the longitudinal axis, L. It can be appreciated that the protect garment 800 is a mirror image across the longitudinal axis, L. Additionally, in this aspect, the central portion 804 of the body 802 of the protective garment 800 can include a collar portion 818 at the leading end 806 of the body 802 of the protective garment 800.

FIG. 8 further shows that the central portion 804 of the body 802 the protective garment 800 can include a left body flap tab 820 and a right body flap tab 822 that can extend from the central portion 804 of the body 802 between a midpoint of the central portion 804 of the body 802 of the protective garment 800 and the trailing end 808 of the body 802 of the protective garment 800. The left body flap tab 820 can extend in a first direction that is substantially perpendicular to a longitudinal axis, L, of the protective garment 800. The right body flap tab 822 can extend in a second direction that is opposite the first direction and is also substantially perpendicular to longitudinal axis, L.

The protective garment 800 can also include a left collar flap tab 824 and a right collar flap tab 826 that can extend from the central portion 804 of the body 802 at or near the leading end 806 of the body 802 of the protective garment 800. The left collar flap tab 824 can extend in a first direction at an angle with respect to the longitudinal axis, L. The right collar flap tab 826 can extend in a second direction opposite the first direction that is also at angle with respect to the longitudinal axis, L.

Still referring to FIG. 8, each of the body flap tabs 820, 822 can include a proximal end 830 and a distal end 832. Further, each of the body flaps 810, 812 can include a proximal end 834 and a distal end 836. As shown, the proximal end 834 of each body flap 810, 812 can be connected to the distal end 832 of a respective body flap tab 820, 822. In particular, each of the body flaps 810, 812 can be attached to a body flap tab 820, 822 via a sewn joint 838. Each sewn joint 838 can include a single row of thread or multiple rows of thread.

As shown in FIG. 8, each of the collar flap tabs 824, 826 can include a proximal end 840 and a distal end 842. Further, each of the collar flaps 814, 816 can include a proximal end 844 and a distal end 846. As shown, the proximal end 844 of each collar flap 814, 816 can be connected to the distal end 842 of a respective collar flap tab 824, 826. In particular, each of the collar flaps 814, 816 can be attached to a body flap tab 824, 826 via a sewn joint 848. Each sewn joint 848 can include a single row of thread or multiple rows of thread.

In a particular aspect, the sewn joints 838, 848 can be breakaway joints and the thread used to sew the sewn joints 838, 848 can be selected so that the tensile strength of the thread will allow the sewn joints 838, 848 to breakaway under load, e.g., if an animal wearing the protective garment 800 is picked up by a bird of prey via the protective garment 800. In other words, the breakaway joints can break apart under a breakaway load to allow the body flaps 810, 812 and collar flaps 814, 816 to disengage from the central portion 804 of the body 802 of the protective garment 800. For example, each sewn joint 838, 848 can have a breakaway load, $L_B$, of less than or equal to 7.5 lbs. Moreover, the $L_B$ can be less than or equal to 6.0 lbs, such as less than or equal to 5.0 lbs, less than or equal to 4.0 lbs, less than or equal to 3.0 lbs, or less than or equal to 2.5 lbs. In another aspect, $L_B$, can be greater than or equal to 1.0 lbs, such as greater than or equal to 1.25 lbs, greater than or equal to 1.5 lbs, greater than or equal to 1.75 lbs, greater than or equal to 2.0 lbs, or greater than or equal to 2.25 lbs. It is to be understood that La can be within a range between, and including, any of the maximum and minimum values of $L_B$ described herein.

It is also to be understood that when a force, or load, is applied to the sewn joints 838, 848 that is greater than $L_B$, the thread used to make the sewn joint 838, 848 will break and will allow the central portion 804 of the body 802 of the protective garment to break away from the straps 810, 812, 814, 186. As such, in the unlikely event that a bird of prey grasps an animal that is wearing the protective garment 800, the bird of prey can fly away with the central portion 804 of the body 802 of the protective garment 800 while the animal that was previously wearing the protective garment 800 can remain on the ground. It is to be understood that the fasteners that are used to connect the side flaps 810, 812 and the collar flaps 814, 816 are substantially stronger than the sewn joints 838, 848. For example, the fasteners that are used to connect the side flaps 810, 812 and the collar flaps 814, 816 are at least two times stronger than the sewn joints 838, 848. Further, the fasteners that are used to connect the side flaps 810, 812 and the collar flaps 814, 816 are at least three times stronger than the sewn joints 838, 848. Moreover, in a particular aspect, the fasteners that are used to connect the side flaps 810, 812 and the collar flaps 814, 816 are at least four times stronger than the sewn joints 838, 848.

Still referring to FIG. 8, the central portion 804 of the body 802 of the protective garment 800 can include a left side pocket 850 adjacent to or near the left body flap tab 820. The left side pocket 850 can span the central portion 804 of the body 802 of the protective garment 800 from near the trailing end 808 of the body 802 of the protective garment 800 just past a midpoint of the body 802 of the protective garment 800. The central portion 804 of the body 802 of the protective garment 800 can also include a right side pocket 852 adjacent to or near the left body flap tab 820. Similar to the left side pocket 850, the right side pocket 852 can span the central portion 804 of the body 802 of the protective garment 800 from near the trailing end 808 of the body 802 of the protective garment 800 just past a midpoint of the body 802 of the protective garment 800.

Figure 15:
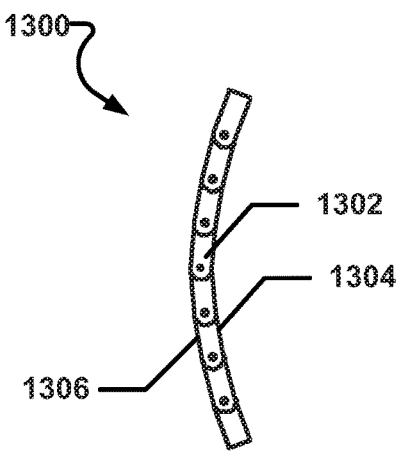
FIG. 15 is a second end plan view of the first embodiment of a side protector shield for a protective garment for an animal.
Figure 16:
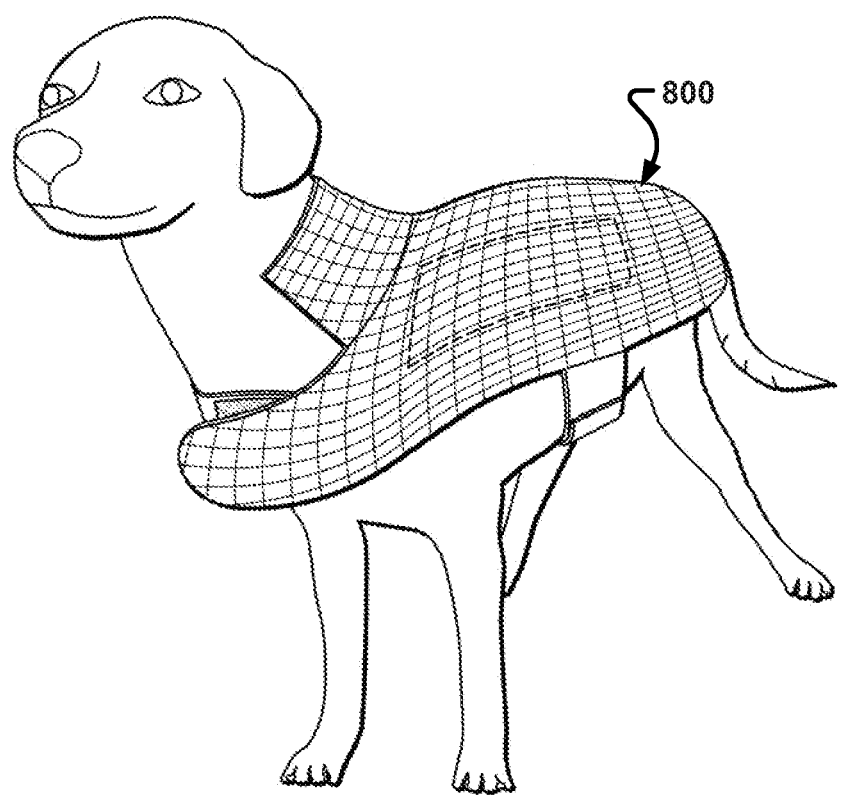
FIG. 16 is a perspective view of the third embodiment of a protective garment for an animal worn by an exemplary animal.
Figure 17:
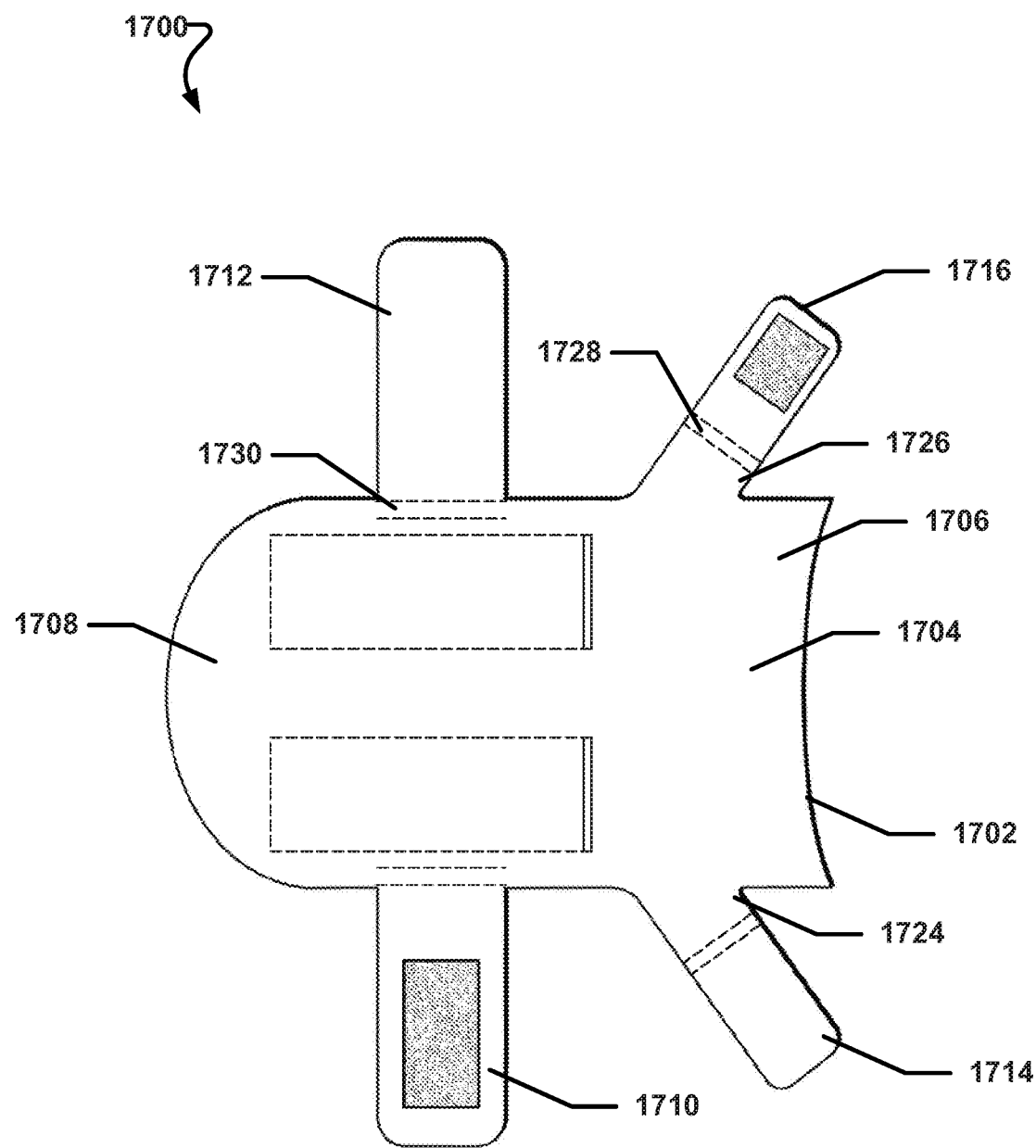
FIG. 17 is a bottom plan view of a fourth embodiment of a protective garment for an animal.

Since FIG. 8 is a bottom plan view of the protective garment 800, it is to be understood that each side pocket 850, 852 is formed in, and is accessible via, the inner surface of the protective garment 800 when the protective garment 800 is worn as illustrated in FIG. 16. As shown, each side pocket 850, 852 can include a generally rectangular pocket body 854 and a pocket opening 856 that leads to the pocket body 854. Each side pocket 850, 852 is configured to receive a side protector shield, e.g., the side protector shield 1000 illustrated in FIG. 10 through FIG. 12 and described below or the side protector shield 1300 illustrated in FIG. 13 through FIG. 15 and described below.

While only two side pockets 850, 852 are illustrated, i.e., one on each side, it is to be understood that each side can include multiple pockets that may have a narrower width. Each of these pockets can include a similarly sized and shaped side protector shield. Having narrower side pockets and protector shields can allow the protector shields to better approximate the curvature of the body of the animal. Further, a pocket can be established along the longitudinal axis and spanning the longitudinal axis and can include a similarly sized and shaped protector shield to protect the animal's spine when the protective garment 800 is worn.

The pocket openings 856 can include a closure, such as a zipper, a button, a snap, Velcro®, etc., in order to prevent either of the side protector shields 1000, 1300 from falling out of the side pockets 850, 852. On the other hand, for comfort, the pocket openings 856 may not include a closure. Since the side pockets 850, 852 are formed on the inside, or underside, of the protective garment 800, e.g., the side closest to the animal when worn, it is unlikely that the side protector shields 1000, 1300 may fall out of the side pockets 850, 852.

In particular aspect, the side pockets 850, 852 can extend at least partially along the length of the central portion 804 of the body 802 of the protective garment 800. Further, each side pocket 850, 852 can have a length, $L_P$, measured in a direction parallel to the longitudinal axis, L, and L can be less than the overall length, $L_O$, of the central portion 804 of the body 802 of the protective garment as measured along the longitudinal axis, L, from the leading end 806 of the central portion 804 of the body 802 of the protective garment 800 to the trailing end 808 of the central portion 804 of the body 802 of the protective garment 800. In a particular aspect, $L_P$ can be less than or equal to 80% $L_O$. Further, $L_P$ can be less than or equal to 75% $L_O$, such as less than or equal to 70% $L_O$, less than or equal to 65% $L_O$, less than or equal to 60% $L_O$, less than or equal to 55% $L_O$, or less than or equal to 50% $L_O$. Further, $L_P$ can be greater than or equal to 25% $L_O$, such as greater than or equal to 30% $L_O$, greater than or equal to 35% $L_O$, or greater than or equal to 40% $L_O$, or greater than or equal to 45% $L_O$. It is to be understood that $L_P$ can be within a range between, and including, any of the maximum and minimum values of $L_P$ described herein.

In another aspect, each side pocket 850, 852 can have a width, $W_P$, measured in a direction perpendicular to the longitudinal axis, L, and $W_P$ can be less than the overall width, $W_O$, of the central portion 804 of the body 802 of the protective garment 800 as measured perpendicular to the longitudinal axis, L, from a first side of the central portion 804 of the body 802 of the protective garment 800 to a second side of the central portion 804 of the body 802 of the protective garment 800. In a particular aspect, $W_P$ can be less than or equal to 50% $W_O$. Further, $W_P$ can be less than or equal to 45% $W_O$, such as less than or equal to 40% $W_O$, or less than or equal to 35% $W_O$. Further, $W_P$ can be greater than or equal to 15% $W_O$, such as greater than or equal to 20% $W_O$, greater than or equal to 25% $W_O$, or greater than or equal to 30% $W_O$. It is to be understood that $W_P$ can be within a range between, and including, any of the maximum and minimum values of $W_P$ described herein.

Figure 9:
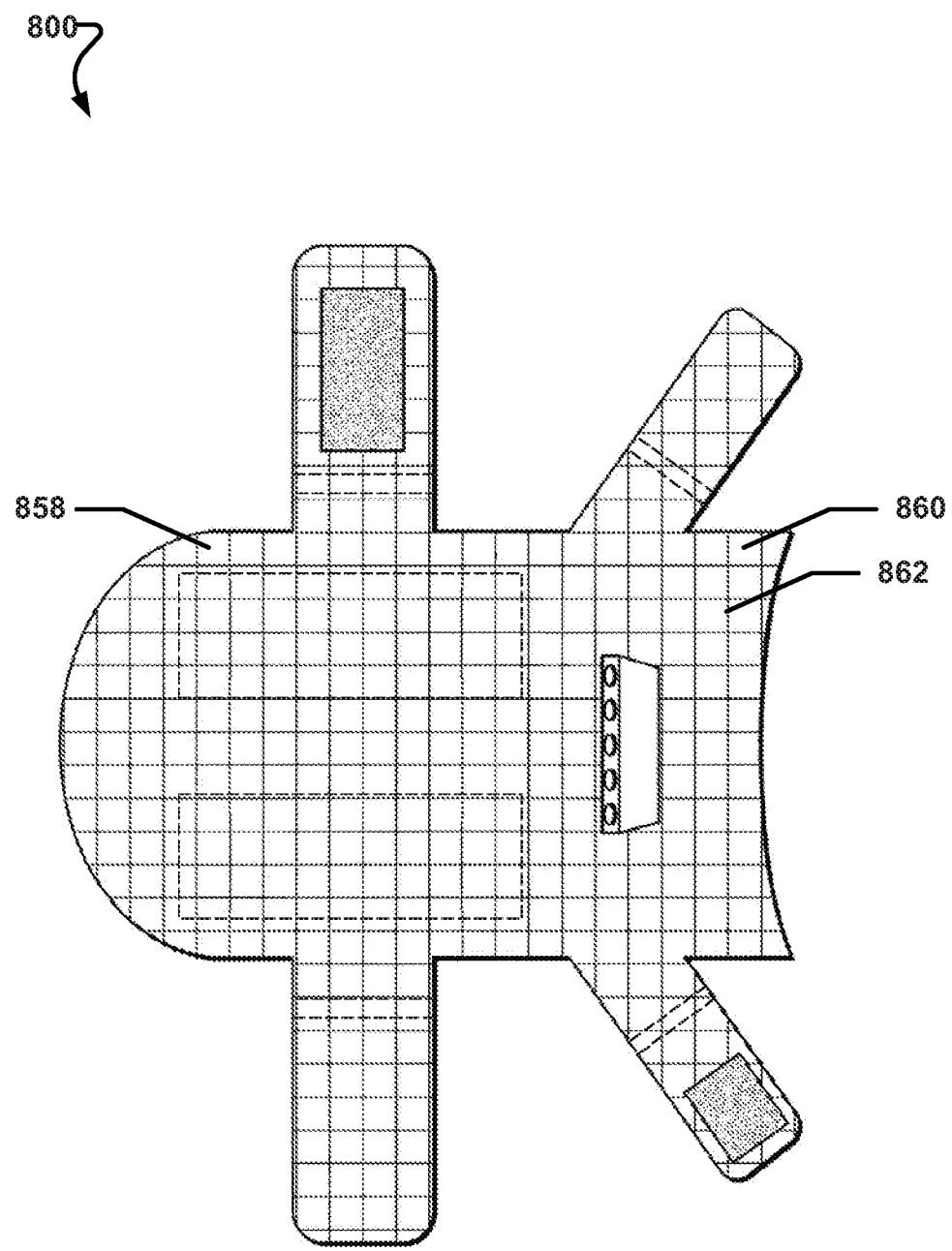
FIG. 9 is a top plan view of the third embodiment of a protective garment for an animal.

FIG. 9 shows that the outer surface 858 of the central portion 804 of the body 802 of the protective garment 800 can include an array having a plurality of cells 860 separated by a black, non-reflective grid 862. Each of the plurality of cells 860 can include an iridescent material that is patterned to shimmer in light in a manner that disorients and confuses a tetrachromatic bird of prey to render the animal wearing the protective garment 800 substantially invisible to the bird of prey and substantially prevent the bird of prey from attacking the animal wearing the protective garment 800.

Each of the plurality of cells 860 can have a two-dimensional shape that is triangular, circular, square, pentagonal, hexagonal, heptagonal, octagonal, nonagonal, decagonal, or a combination thereof. In another aspect, the outer surface 824 of the central portion 804 of the body 802 of the protective garment 800 can include a plurality of individual cells applied to a black, non-reflective background, so that the black, non-reflective background appears to be a black, non-reflective grid 862 separating each of the plurality of cells 860. In a particular aspect, all of the cells 860 can be the same size or the cells 860 can be a mixture of sizes. Further, the cells 860 can be uniform in shape or the cells 860 can be a mixture of shapes. Additionally, the cells 860 can be a uniform in shape and size or the cells 860 can be a mixture of shapes and sizes. In still another aspect, a majority of the iridescent cells 860 within the array of iridescent cells 860 are substantially the same size. Further still, in another aspect, a majority of the iridescent cells 860 within the array of iridescent cells 860 are substantially the same shape. Moreover, in another aspect, at least a portion of the array of iridescent cells 860 comprises a regular pattern of similarly sized and shaped iridescent cells 860.

In another aspect, the black, non-reflective grid 862 is non-iridescent and can have a light reflectance value (LRV) that can be less than or equal to 15.0%. Further, LRV can be less than or equal to 12.5% such as, less than or equal to 10.0%, less than or equal to 9.0%, less than or equal to 8.0%, or less than or equal to 7.5%. In another aspect, the LRV of the grid 862 can be greater than or equal to 5.0%, such as greater than or equal to 5.75%, greater than or equal to 6.0%, greater than or equal to 6.25%, greater than or equal to 6.5%, greater than or equal to 6.75%, or greater than or equal to 7.0%. It is to be understood that the LRV of the grid 862 can be within a range between, and including, any of the maximum and minimum values of LRV described herein.

Figure 10:
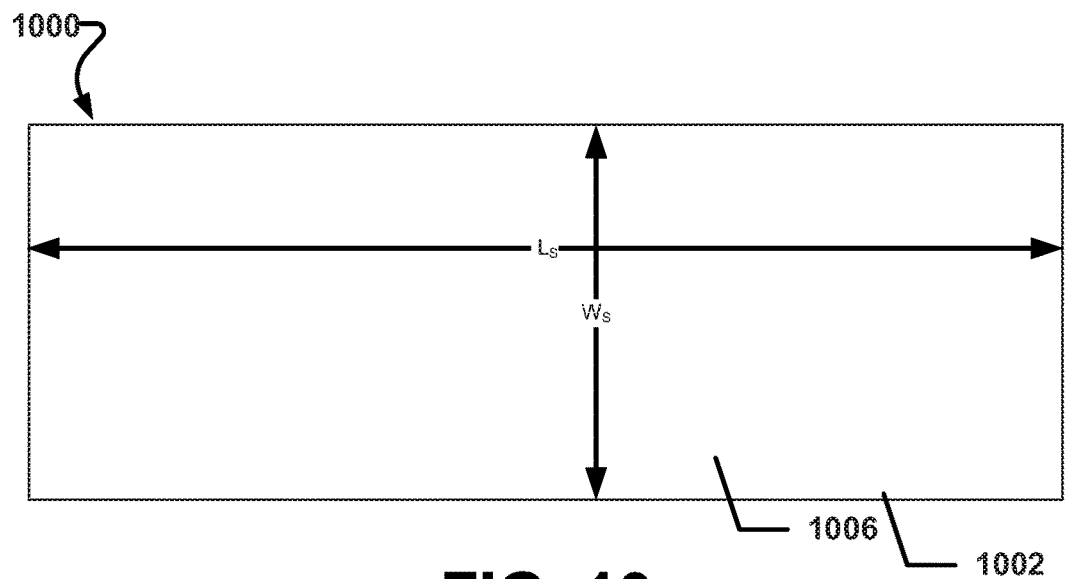
FIG. 10 is a first side plan view of a first embodiment of a side protector shield for a protective garment for an animal.
Figure 11:
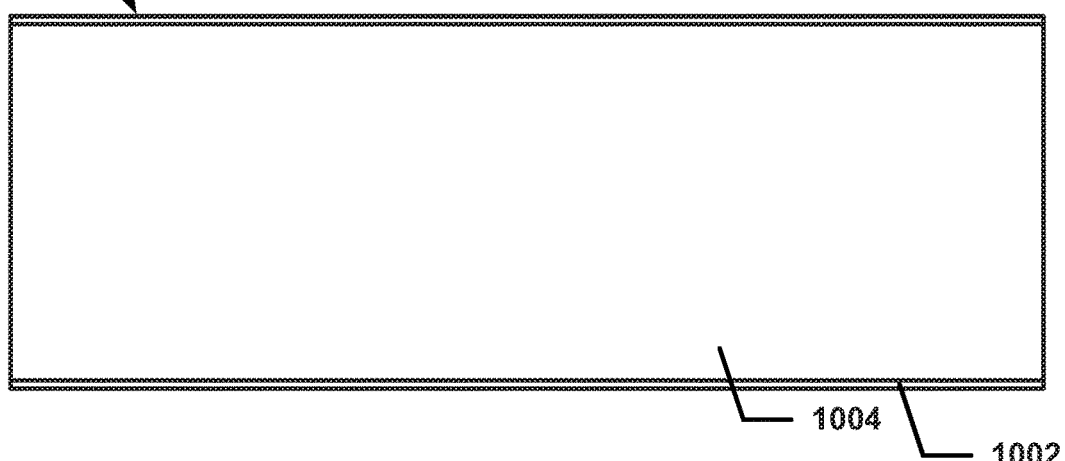
FIG. 11 is a second side plan view of the first embodiment of a side protector shield for a protective garment for an animal.
Figure 12:
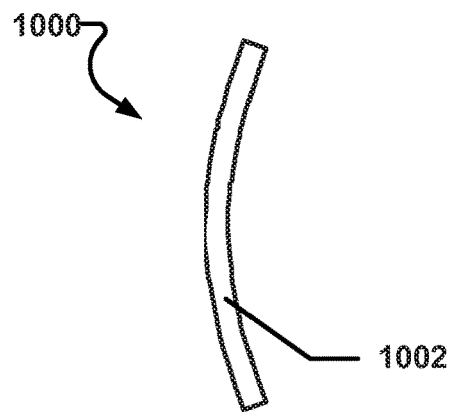
FIG. 12 is an end plan view of a first embodiment of a side protector shield for a protective garment for an animal.

Referring now to FIG. 10 through FIG. 12 a first side protector shield 1000 is illustrated. The side protector shield 1000 is sized and shaped to fit into the side pockets 850, 852 of the protective garment 800. Specifically, the side protector shield 1000 can have a body 1002 that has an inner surface 1004 and an outer surface 1006. Further, as shown in FIG. 12, the side protector shield 1000 is curved to closely match the shape of an animal's body. When protective garment 800 is properly worn with the side protector shields 1000 installed within the side pockets 850, 852, the inner surface 1004 of the side protector shield 1000 will be adjacent to the body of the animal.

In a particular aspect, the side protector shield 1000 can be essentially the same size as the side pocket 850, 852 in which it is installed. Further, the side protector shield can have a length, $L_S$, that is less than $L_O$ of the central portion 804 of the body 802 of the protective garment 800. Specifically, $L_S$ can be less than or equal to 80% $L_O$. Further, $L_S$ can be less than or equal to 75% $L_O$, such as less than or equal to 70% $L_O$, less than or equal to 65% $L_O$, less than or equal to 60% $L_O$, less than or equal to 55% $L_O$, or less than or equal to 50% $L_O$. Further, $L_S$ can be greater than or equal to 25% $L_O$, such as greater than or equal to 30% $L_O$, greater than or equal to 35% $L_O$, greater than or equal to 40% $L_O$, or greater than or equal to 45% $L_O$. It is to be understood that $L_S$ can be within a range between, and including, any of the maximum and minimum values of $L_S$ described herein.

In another aspect, the side protector shield 1000 can have a width, $W_S$, and $W_S$ can be less than $W_O$ of the central portion 804 of the body 802 of the protective garment 800. In a particular aspect, $W_S$ can be less than or equal to 50% $W_O$. Further, $W_S$ can be less than or equal to 45% $W_O$, such as less than or equal to 40% $W_O$, or less than or equal to 35% $W_O$. Further, $W_S$ can be greater than or equal to 15% $W_O$, such as greater than or equal to 20% $W_O$, greater than or equal to 25% $W_O$, or greater than or equal to 30% $W_O$. It is to be understood that $W_S$ can be within a range between, and including, any of the maximum and minimum values of $W_S$ described herein.

Further, when installed, the side protector shields 1000 can provide a protection area, $A_P$, along the sides of the protective garment 800. It is to be understood that $A_P$ is equal to the area protected by both side protector shields 1000 combined. In a particular aspect, $A_P$ can be less than the total area, $A_T$, of the central portion 804 of the body 802 of the protective garment 800 (not including the area of the flaps 810, 812, 814, 816 and tabs 820, 822, 824, 826). For example, $A_P$ can be less than or equal to 70% $A_T$. Further, $A_P$ can be less than or equal to 65% $A_T$, such as less than or equal to 60% $A_T$, less than or equal to 55% $A_T$, less than or equal to 50% $A_T$, less than or equal to 45% $A_T$, less than or equal to 40% $A_T$, or less than or equal to 35% $A_T$. In another aspect, $A_P$ can be greater than or equal to 20% $A_T$, such as greater than or equal to 25% $A_T$, or greater than or equal to 30% $A_T$. It is to be understood that $A_P$ can be within a range between, and including, any of the values of $A_P$ described herein.

The side protector shield 1000 can be made from a metal, a metal alloy, a polymer, a ceramic, or a combination thereof. For example, the side protector shield 1000 can be made from iron, aluminum, copper, steel, stainless steel, bronze, polycarbonate, poly(methyl methacrylate), polyvinyl chloride, acrylic-polyvinyl chloride, silicon nitride, silicon carbide, or any combination thereof. When the side protector shields 1000 are installed within side pockets 850, 852 of the protective garment 800 and the protective garment 800 is worn as shown in FIG. 16, the side protector shields 1000 can span the portion of the animal's body that is most likely to be grabbed by a predatory bird in the unlikely event that the pattern on the outer surface 858 of the protective garment 800 is unable to prevent the predatory bird from seeing the protective garment 800 and the animal that is wearing the protective garment 800, e.g., in a low light condition.

Figure 13:
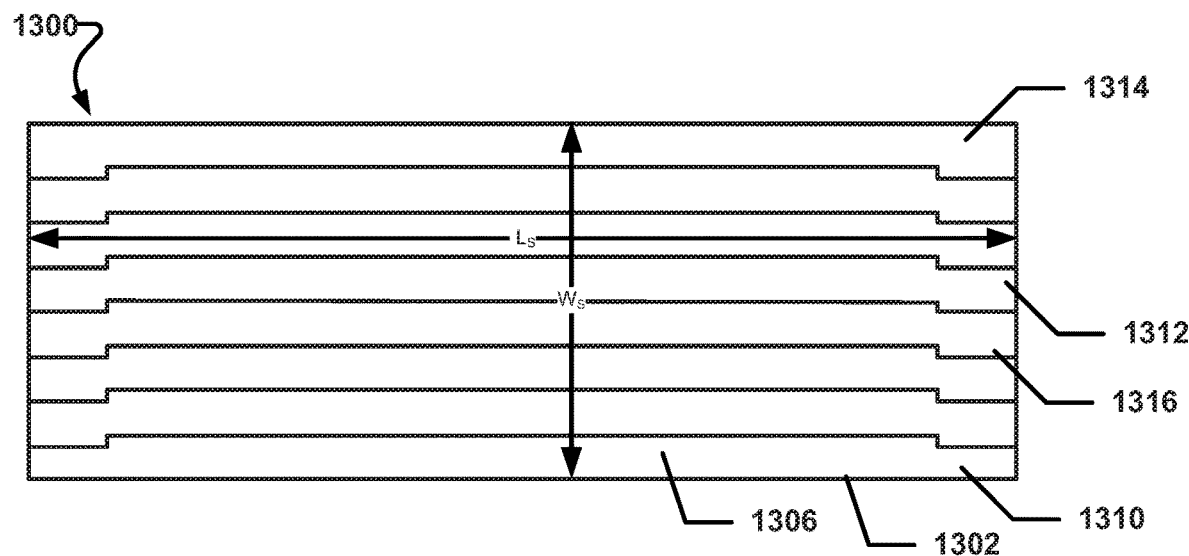
FIG. 13 is a side plan view of a second embodiment of a side protector shield for a protective garment for an animal.
Figure 14:
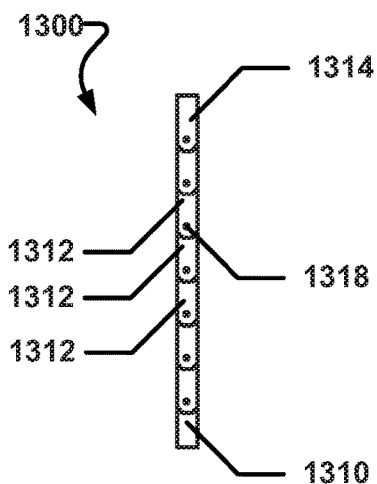
FIG. 14 is a first end plan view of the second embodiment of a side protector shield for a protective garment for an animal.

Referring now to FIG. 13 through FIG. 15 a second side protector shield 1300 is illustrated. The side protector shield 1300 is sized and shaped to fit into the side pockets 850, 852 of the protective garment 800. Specifically, the side protector shield 1300 can have a body 1302 that has an inner surface 1304 and an outer surface 1306. Additionally, the body 1302 of the side protector shield 1300 can have a lower segment 1310, a plurality of intermediate segments 1312, and an upper segment 1314. The segments 1310, 1312, 1314 can be interconnected via a plurality of hinges 1316 and held together with pins 1318. It is to be understood that the segments 1310, 1312, 1314 are machine to high tolerances to prevent gaps from forming. The elimination of gaps will substantially prevent the talons of a bird of prey from having something to grab on in the event of an attempt to attack an animal wearing the protective garment 800 with the side protector shields 1300 installed therein.

As shown in FIG. 15, during use, the side protector shield 1300 can bend to closely match the shape of an animal's body. Further, as shown in FIG. 16, when protective garment 800 is properly worn with the side protector shields 1300 installed within the side pockets 850, 852, the inner surface 1304 of the side protector shield 1300 will be adjacent to the body of the animal and the hinges will allow the side protector shield 1300 to better conform to the shape of the animal's body—unlike a solid rigid shield, e.g., the side protector shield 1000 illustrated in FIG. 10 through FIG. 12.

In a particular aspect, the side protector shield 1300 can be essentially the same size as the side pocket 850, 852 in which it is installed. Further, the side protector shield can have a length, $L_S$, that is less than $L_O$ of the central portion 804 of the body 802 of the protective garment 800. Specifically, $L_S$ can be less than or equal to 80% $L_O$. Further, $L_S$ can be less than or equal to 75% $L_O$, such as less than or equal to 70% $L_O$, less than or equal to 65% $L_O$, less than or equal to 60% $L_O$, less than or equal to 55% $L_O$, or less than or equal to 50% $L_O$. Further, $L_S$ can be greater than or equal to 25% $L_O$, such as greater than or equal to 30% $L_O$, greater than or equal to 35% $L_O$, greater than or equal to 40% $L_O$, or greater than or equal to 45% $L_O$. It is to be understood that $L_S$ can be within a range between, and including, any of the maximum and minimum values of $L_S$ described herein.

In another aspect, the side protector shield 1300 can have a width, $W_S$, and $W_S$ can be less than $W_O$ of the central portion 804 of the body 802 of the protective garment 800. In a particular aspect, $W_S$ can be less than or equal to 50% $W_O$. Further, $W_S$ can be less than or equal to 45% $W_O$, such as less than or equal to 40% $W_O$, or less than or equal to 35% $W_O$. Further, $W_S$ can be greater than or equal to 15% $W_O$, such as greater than or equal to 20% $W_O$, greater than or equal to 25% $W_O$, or greater than or equal to 30% $W_O$. It is to be understood that $W_S$ can be within a range between, and including, any of the maximum and minimum values of $W_S$ described herein.

Further, when installed, the side protector shields 1300 can provide a protection area, $A_P$, along the sides of the protective garment 800. It is to be understood that $A_P$ is equal to the area protected by both side protector shields 1300 combined. In a particular aspect, $A_P$ can be less than the total area, $A_T$, of the central portion 804 of the body 802 of the protective garment 800 (not including the area of the flaps 810, 812, 814, 816 and tabs 820, 822, 824, 826). For example, $A_P$ can be less than or equal to 70% $A_T$. Further, $A_P$ can be less than or equal to 65% $A_T$, such as less than or equal to 60% $A_T$, less than or equal to 55% $A_T$, less than or equal to 50% $A_T$, less than or equal to 45% $A_P$, less than or equal to 40% $A_T$, or less than or equal to 35% $A_T$. In another aspect, $A_P$ can be greater than or equal to 20% $A_T$, such as greater than or equal to 25% $A_T$, or greater than or equal to 30% $A_T$. It is to be understood that $A_P$ can be within a range between, and including, any of the values of $A_P$ described herein.

The side protector shield 1300 can be made from a metal, a metal alloy, a polymer, a ceramic, or a combination thereof. For example, the side protector shield 1300 can be made from iron, aluminum, copper, steel, stainless steel, bronze, polycarbonate, poly(methyl methacrylate), polyvinyl chloride, acrylic-polyvinyl chloride, silicon nitride, silicon carbide, or any combination thereof. When the side protector shields 1300 are installed within side pockets 850, 852 of the protective garment 800 and the protective garment 800 is worn as shown in FIG. 16, the side protector shields 1300 can span the portion of the animal's body that is most likely to be grabbed by a predatory bird in the unlikely event that the pattern on the outer surface 858 of the protective garment 800 is unable to prevent the predatory bird from seeing the protective garment 800 and the animal that is wearing the protective garment 800, e.g., in a low light condition.

Referring now to FIG. 17, a fourth embodiment of a protective garment is illustrated and is generally designated 1700. In this embodiment, the protective garment 1700 includes a body 1702 having a central portion 1704. As indicated in FIG. 17, the protective garment 1700 can include a left body flap 1710 and a right body flap 1712 that can extend from the central portion 1704 of the body 1702 between a midpoint of the central portion 1704 of the body 1702 of the protective garment 1700 and the trailing end 1708 of the body 1702 of the protective garment 1700. The left body flap 1710 can extend in a first direction that is substantially perpendicular to a longitudinal axis, L, of the protective garment 1700. The right body flap 1712 can extend in a second direction that is opposite the first direction and is also substantially perpendicular to longitudinal axis, L.

Further, the protective garment 1700 can include a left collar flap 1714 and a right collar flap 1716 that can extend from the central portion 1704 of the body 1702 at or near the leading end 1706 of the body 1702 of the protective garment 1700. The left collar flap 1714 can extend in a first direction at an angle with respect to the longitudinal axis, L. The right collar flap 1716 can extend in a second direction opposite the first direction that is also at angle with respect to the longitudinal axis, L. It can be appreciated that the protect garment 1700 is a mirror image across the longitudinal axis, L. Additionally, in this aspect, the central portion 1704 of the body 1702 of the protective garment 1700 can include a collar portion 1718 at the leading end 1706 of the body 1702 of the protective garment 1700.

While the collar flaps 1714, 1716 can be connected to collar flap tabs 1724, 1726 by breakaway sewn joints 1728, similar to the sewn joints 838, 848 described above, the body flaps 1710, 1712 can be connected directly to the perimeter edge of the central portion 1704 of the body 1702 of the protective garment 1700 thereby eliminating the previously described body flap tabs. The body flaps 1710, 1712 can be connect to the central portion 1702 via breakaway sewn joints 1730 that are similar to the sewn joints 838, 848, described above.

Figure 18:
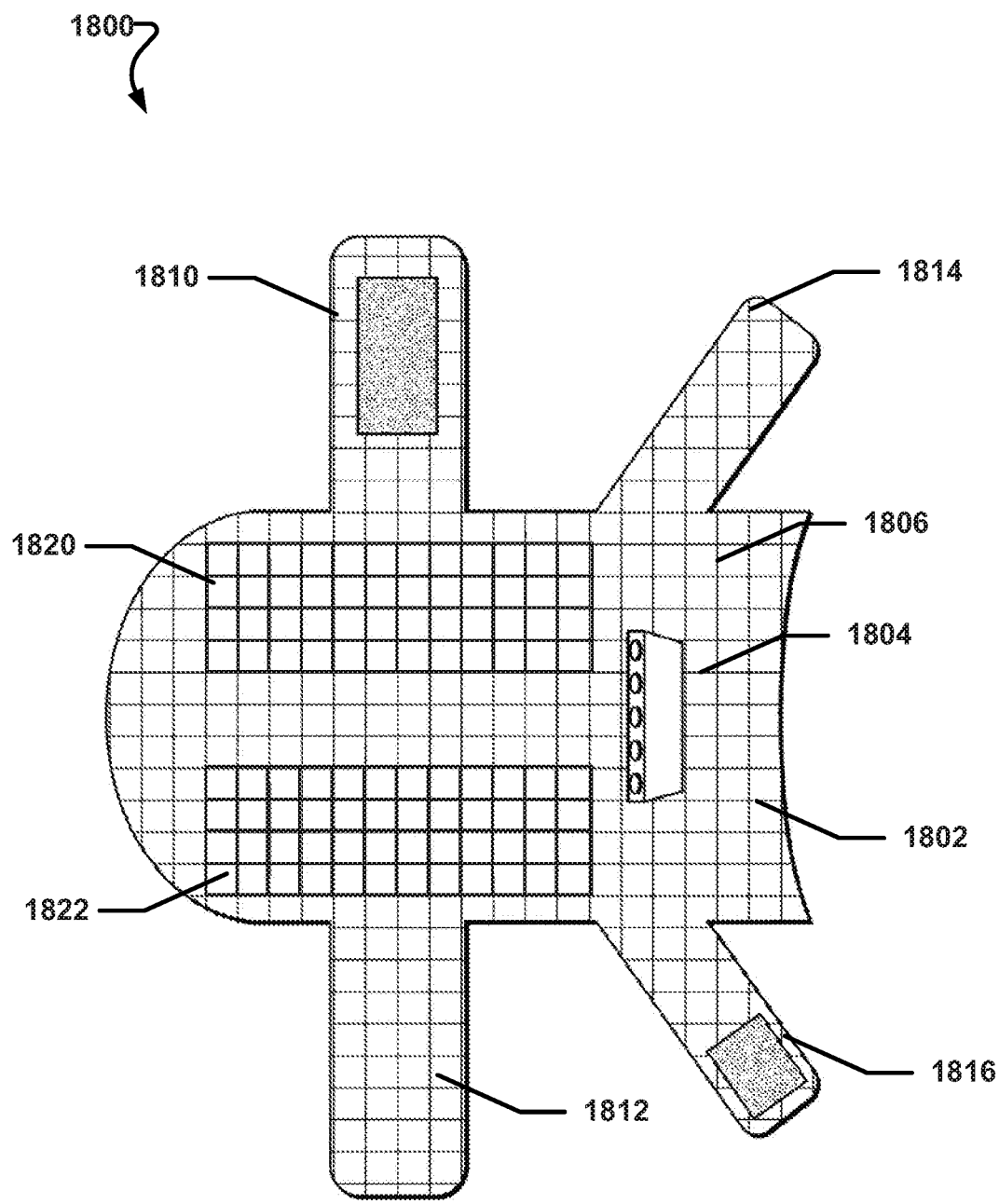
FIG. 18 is a top plan view of a fifth embodiment of a protective garment for an animal.

Referring now to FIG. 18 through FIG. 23, a fifth embodiment of a protective garment for an animal is illustrated and is generally designated 1800. As shown in FIG. 18, the protective garment 1800 can include a body 1802 having a central portion 1804. The central portion 1804 can include a leading end 1806 and a trailing end 1808. In a particular aspect, when the protective garment 1800 is worn by an animal, e.g., a dog, as depicted in FIG. 17, the leading end 1806 of the central portion 1804 of the body 1802 of the protective garment 1800 can be near or adjacent to the animal's head. Further, the trailing end 1808 of the central portion 1804 of the body 1802 of the protective garment 1800 can be near or adjacent to the animal's hind quarters.

As indicated in FIG. 18, the protective garment 1800 can include a left body flap 1810 and a right body flap 1812 that can extend from the central portion 1804 of the body 1802 between a midpoint of the central portion 1804 of the body 1802 of the protective garment 1800 and the trailing end 1808 of the body 1802 of the protective garment 1800. The left body flap 1810 can extend in a first direction that is substantially perpendicular to a longitudinal axis, L, of the protective garment 1800. The right body flap 1812 can extend in a second direction that is opposite the first direction and is also substantially perpendicular to longitudinal axis, L.

Further, the protective garment 1800 can include a left collar flap 1814 and a right collar flap 1816 that can extend from the central portion 1804 of the body 1802 at or near the leading end 1806 of the body 1802 of the protective garment 1800. The left collar flap 1814 can extend in a first direction at an angle with respect to the longitudinal axis, L. The right collar flap 1816 can extend in a second direction opposite the first direction that is also at angle with respect to the longitudinal axis, L. It can be appreciated that the protect garment 1800 is a mirror image across the longitudinal axis, L. Additionally, in this aspect, the central portion 1804 of the body 1802 of the protective garment 1800 can include a collar portion 1818 at the leading end 1806 of the body 1802 of the protective garment 1800.

FIG. 18 further shows that the central portion 1804 of the body 1802 the protective garment 1800 can include a left side protector shield 1820 and a right side protector shield 1822 that can be removably engaged with the outer surface 1824 of the central portion 1804 of the body 1802 of the protective garment 1800. The left side protector shield 1820 can span the central portion 1804 of the body 1802 of the protective garment 1800 from near the trailing end 1808 of the body 1802 of the protective garment 1800 just past a midpoint of the body 1802 of the protective garment 1800. The right side protector shield 1822 can span the central portion 1804 of the body 1802 of the protective garment 1800 from near the trailing end 1808 of the body 1802 of the protective garment 1800 just past a midpoint of the body 1802 of the protective garment 1800.

In particular aspect, the side protector shields 1820, 1822 can extend at least partially along the length of the central portion 1804 of the body 1802 of the protective garment 1800. Further, each side protector shield 1820, 1822 can have a length, $L_S$, measured in a direction parallel to the longitudinal axis, L, and $L_S$ can be less than the overall length, $L_O$, of the central portion 1804 of the body 1802 of the protective garment as measured along the longitudinal axis, L, from the leading end 1806 of the central portion 1804 of the body 1802 of the protective garment 1800 to the trailing end 1808 of the central portion 804 of the body 1802 of the protective garment 1800. In a particular aspect, $L_S$ can be less than or equal to 180% $L_O$. Further, $L_S$ can be less than or equal to 75% $L_O$, such as less than or equal to 70% $L_O$, less than or equal to 65% $L_O$, less than or equal to 60% $L_O$, less than or equal to 55% $L_O$, or less than or equal to 50% $L_O$. Further, $L_S$ can be greater than or equal to 25% $L_O$, such as greater than or equal to 30% $L_O$, greater than or equal to 35% $L_O$, greater than or equal to 40% $L_O$, or greater than or equal to 45% $L_O$. It is to be understood that $L_S$ can be within a range between, and including, any of the maximum and minimum values of $L_S$ described herein.

In another aspect, each side protector shield 1820, 1822 can have a width, $W_S$, measured in a direction perpendicular to the longitudinal axis, L, and $W_S$ can be less than the overall width, $W_O$, of the central portion 1804 of the body 1802 of the protective garment 1800 as measured perpendicular to the longitudinal axis, L, from a first side of the central portion 1804 of the body 1802 of the protective garment 1800 to a second side of the central portion 804 of the body 1802 of the protective garment 1800. In a particular aspect, $W_S$ can be less than or equal to 50% $W_O$. Further, $W_S$ can be less than or equal to 45% $W_O$, such as less than or equal to 40% $W_O$, or less than or equal to 35% $W_O$. Further, $W_S$ can be greater than or equal to 15% $W_O$, such as greater than or equal to 20% $W_O$, greater than or equal to 25% $W_O$, or greater than or equal to 30% $W_O$. It is to be understood that $W_S$ can be within a range between, and including, any of the maximum and minimum values of $W_S$ described herein.

Figure 19:
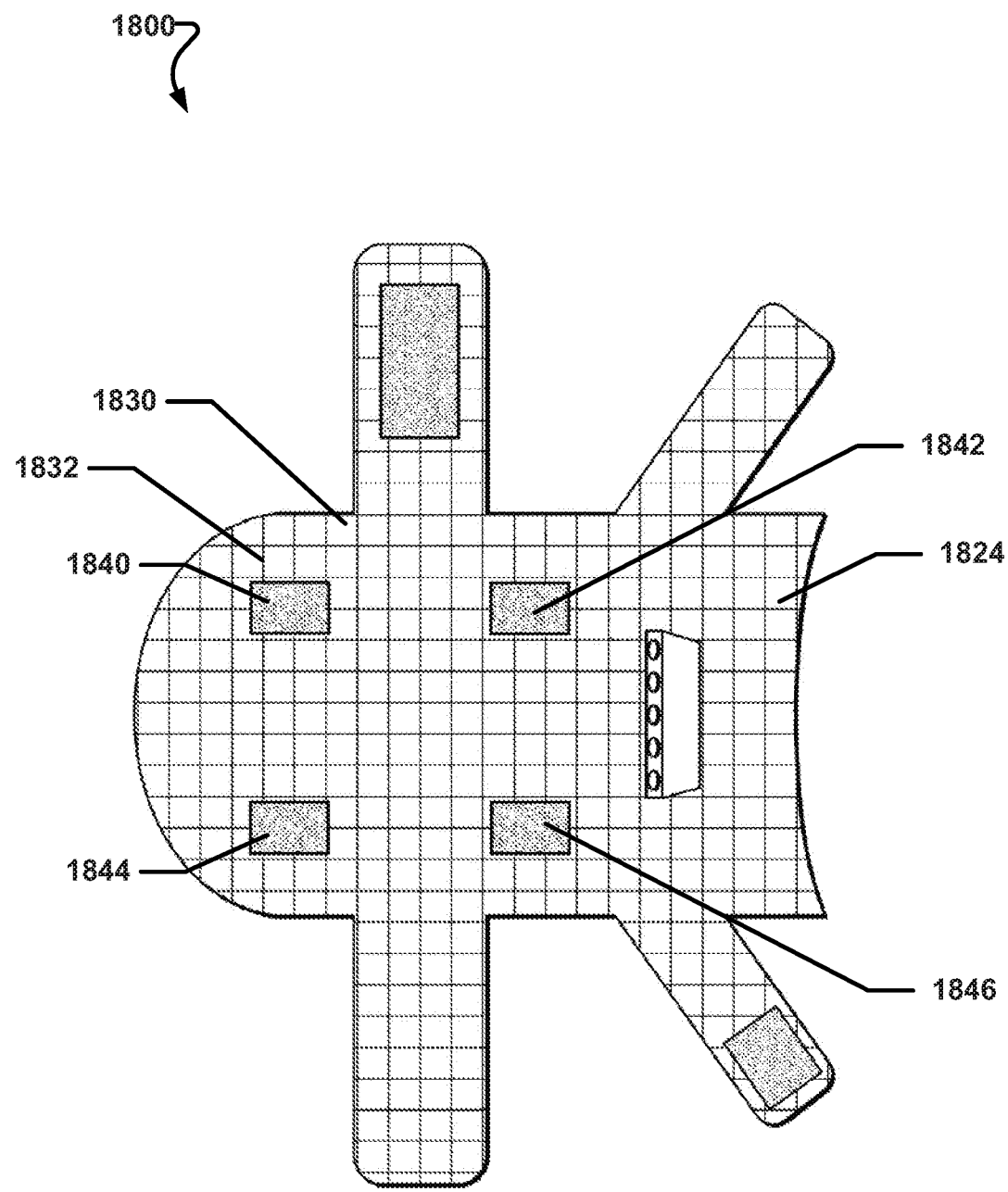
FIG. 19 is another top plan view of the fifth embodiment of a protective garment for an animal.

FIGS. 18 and 19 show that the outer surface 1824 of the central portion 1804 of the body 1802 of the protective garment 1800 can include an array having a plurality of cells 1830 separated by a black, non-reflective grid 1832. Each of the plurality of cells 1830 can include an iridescent material that is patterned to shimmer in light in a manner that disorients and confuses a tetrachromatic bird of prey to render the animal wearing the protective garment 1800 substantially invisible to the bird of prey and substantially prevent the bird of prey from attacking the animal wearing the protective garment 1800.

Each of the plurality of cells 1830 can have a two-dimensional shape that is triangular, circular, square, pentagonal, hexagonal, heptagonal, octagonal, nonagonal, decagonal, or a combination thereof. In another aspect, the outer surface 1824 of the central portion 1804 of the body 1802 of the protective garment 1800 can include a plurality of individual cells applied to a black, non-reflective background, so that the black, non-reflective background appears to be a black, non-reflective grid 1832 separating each of the plurality of cells 1830. In a particular aspect, all of the cells 1830 can be the same size or the cells 1830 can be a mixture of sizes. Further, the cells 1830 can be uniform in shape or the cells 1830 can be a mixture of shapes. Additionally, the cells 1830 can be a uniform in shape and size or the cells 1830 can be a mixture of shapes and sizes. In still another aspect, a majority of the iridescent cells 1830 within the array of iridescent cells 1830 are substantially the same size. Further still, in another aspect, a majority of the iridescent cells 1830 within the array of iridescent cells 1830 are substantially the same shape. Moreover, in another aspect, at least a portion of the array of iridescent cells 1830 comprises a regular pattern of similarly sized and shaped iridescent cells 1830.

In another aspect, the black, non-reflective grid 1832 is non-iridescent and can have a light reflectance value (LRV) that can be less than or equal to 15.0%. Further, LRV can be less than or equal to 12.5% such as, less than or equal to 10.0%, less than or equal to 9.0%, less than or equal to 8.0%, or less than or equal to 7.5%. In another aspect, the LRV of the grid 1832 can be greater than or equal to 5.0%, such as greater than or equal to 5.75%, greater than or equal to 6.0%, greater than or equal to 6.25%, greater than or equal to 6.5%, greater than or equal to 6.75%, or greater than or equal to 7.0%. It is to be understood that the LRV of the grid 1832 can be within a range between, and including, any of the maximum and minimum values of LRV described herein.

FIG. 19 also shows that the outer surface 1824 of the central portion 1804 of the body 1802 of the protective garment 1800 can include a pair of left side fasteners 1840, 1842 that are configured to receive and engage complimentary fasteners formed or disposed on an inner surface of the left side protector shield 1820 described in detail below. The outer surface 1824 of the central portion 1804 of the body 1802 of the protective garment 1800 can also include a pair of right side fasteners 1844, 1846 that are configured to receive and engage complimentary fasteners formed or disposed on an inner surface of the right side protector shield 1822 described in detail below. The side fasteners 1840, 1842, 1844, 1846 can be snaps, Velcro®, or some other fastener that can be easily disengaged under a load. It is to be understood that the size of the Velcro®, e.g., the area thereof, may determine the load under which the side fasteners 1840, 1842, 1844, 1846 disengage and breakaway.

Figure 20:
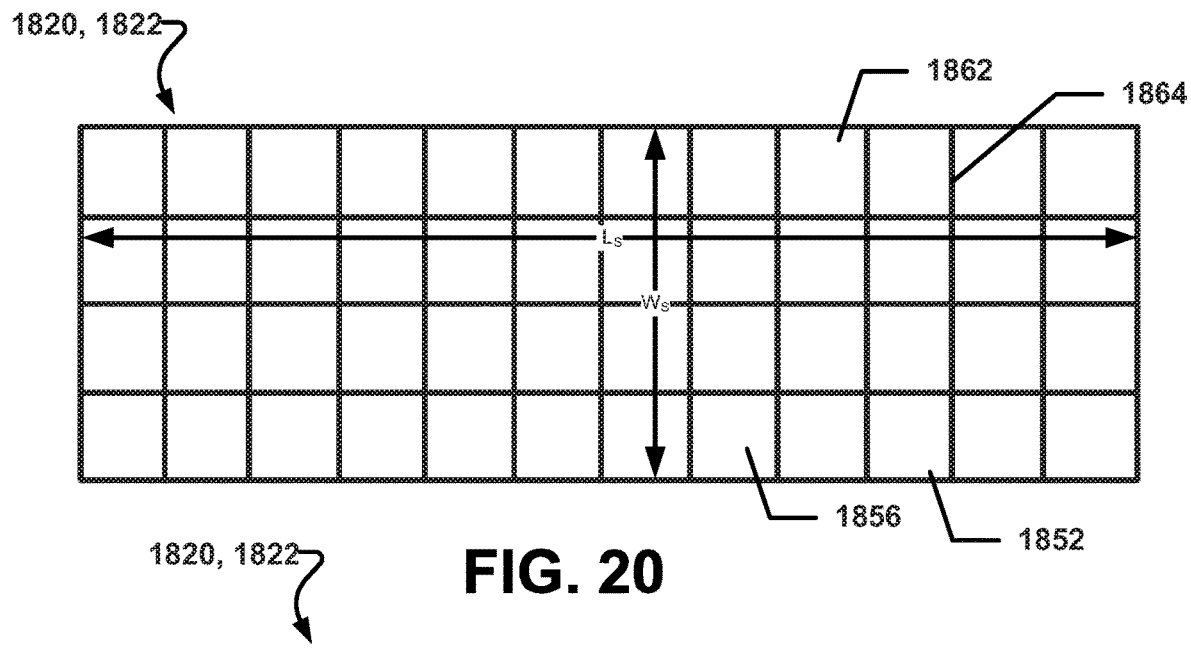
FIG. 20 is a front plan view of a second embodiment of a side protector shield for a protective garment for an animal.
Figure 21:
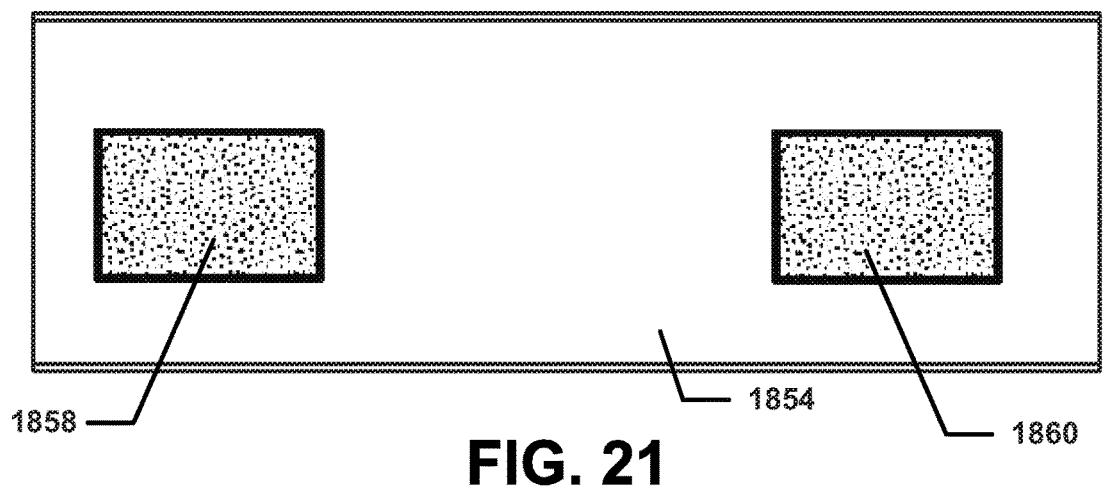
FIG. 21 is a rear plan view of the second embodiment of a side protector shield for a protective garment for an animal.
Figure 22:
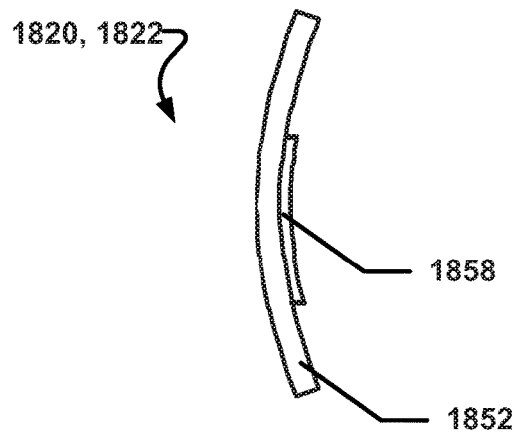
FIG. 22 is a side plan view of a second embodiment of a side protector shield for a protective garment for an animal.

Referring now to FIG. 20 through FIG. 22 details concerning the left and right side protector shields 1820, 1822 are illustrated. Each side protector shield 1820, 1822 can have a body 1852 that has an inner surface 1854 and an outer surface 1856. Further, as shown in FIG. 22, the side protector shield 1820, 1822 is curved to closely match the shape of an animal's body. FIG. 21 also shows that each side protector shield 1820, 1822 can include a pair of fasteners 1858, 1860 that can removably engage the complimentary fasteners 1830, 1832, 1840, 1842 on the outer surface 1824 of the central portion 1804 of the body 1802 of the protective garment 1800 to establish breakaway connections that can breakaway, or disengage, under load, e.g., if an animal wearing the protective garment 1800 is picked up by a bird of prey via the protective garment 1800.

In a particular aspect, the fasteners 1858, 1860 can be snaps, Velcro®, or some other fastener that can be easily disengaged under a load. It is to be understood that the size of the Velcro®, e.g., the area thereof, may determine the load under which the fasteners 1858, 1860 can disengage and breakaway. Further, it is to be understood that the fasteners that connect the side flaps 1810, 1812 and collar slaps 1814, 1816 are substantially stronger than the fasteners 1840, 1842, 1844, 1846, 1858, 1860 that connect the side protector shields 1820, 1822 to the protective garment 1800. In a particular aspect, the fasteners that connect the side flaps 1810, 1812 and collar slaps 1814, 1816 are at least two times stronger than the fasteners 1840, 1842, 1844, 1846, 1858, 1860 that connect the side protector shields 1820, 1822 to the protective garment 1800. In another aspect, the fasteners that connect the side flaps 1810, 1812 and collar slaps 1814, 1816 are at least three times stronger than the fasteners 1840, 1842, 1844, 1846, 1858, 1860 that connect the side protector shields 1820, 1822 to the protective garment 1800. Further, the fasteners that connect the side flaps 1810, 1812 and collar slaps 1814, 1816 are at least four times stronger than the fasteners 1840, 1842, 1844, 1846, 1858, 1860 that connect the side protector shields 1820, 1822 to the protective garment 1800.

For example, each breakaway connection can have a breakaway load, $L_B$, of less than or equal to 7.5 lbs. Moreover, the $L_B$ can be less than or equal to 6.0 lbs, such as less than or equal to 5.0 lbs, less than or equal to 4.0 lbs, less than or equal to 3.0 lbs, or less than or equal to 2.5 lbs. In another aspect, $L_B$, can be greater than or equal to 1.0 lbs, such as greater than or equal to 1.25 lbs, greater than or equal to 1.5 lbs, greater than or equal to 1.75 lbs, greater than or equal to 2.0 lbs, or greater than or equal to 2.25 lbs. It is to be understood that La can be within a range between, and including, any of the maximum and minimum values of $L_B$ described herein.

It is also to be understood that when a force, or load, is applied to the breakaway connection that is greater than $L_B$, the connectors used to establish the breakaway connection will disengage from each other and will allow the side protector shields 1820, 1822 to disengage from the central portion 1804 of the body 1802 of the protective garment 1800. As such, in the unlikely event that a bird of prey grasps an animal that is wearing the protective garment 1800, the bird of prey can fly away with the side protector shields 1820, 1822 while the animal wearing the protective garment 1800 remains on the ground.

Further, when installed, the side protector shields 1820, 1822 can provide a protection area, $A_P$, along the sides of the protective garment 1800. It is to be understood that $A_P$ is equal to the area protected by both side protector shields 1820, 1822 combined. In a particular aspect, $A_P$ can be less than the total area, $A_T$, of the central portion 1804 of the body 1802 of the protective garment 1800 (not including the area of the flaps 1810, 1812, 1814, 1816). For example, $A_P$ can be less than or equal to 70% $A_T$. Further, $A_P$ can be less than or equal to 65% $A_T$, such as less than or equal to 60% $A_T$, less than or equal to 55% $A_T$, less than or equal to 50% $A_T$, less than or equal to 45% $A_T$, less than or equal to 40% $A_T$, or less than or equal to 35% $A_T$. In another aspect, $A_P$ can be greater than or equal to 20% $A_T$, such as greater than or equal to 25% $A_T$, or greater than or equal to 30% $A_T$. It is to be understood that $A_P$ can be within a range between, and including, any of the values of $A_P$ described herein.

Figure 23:
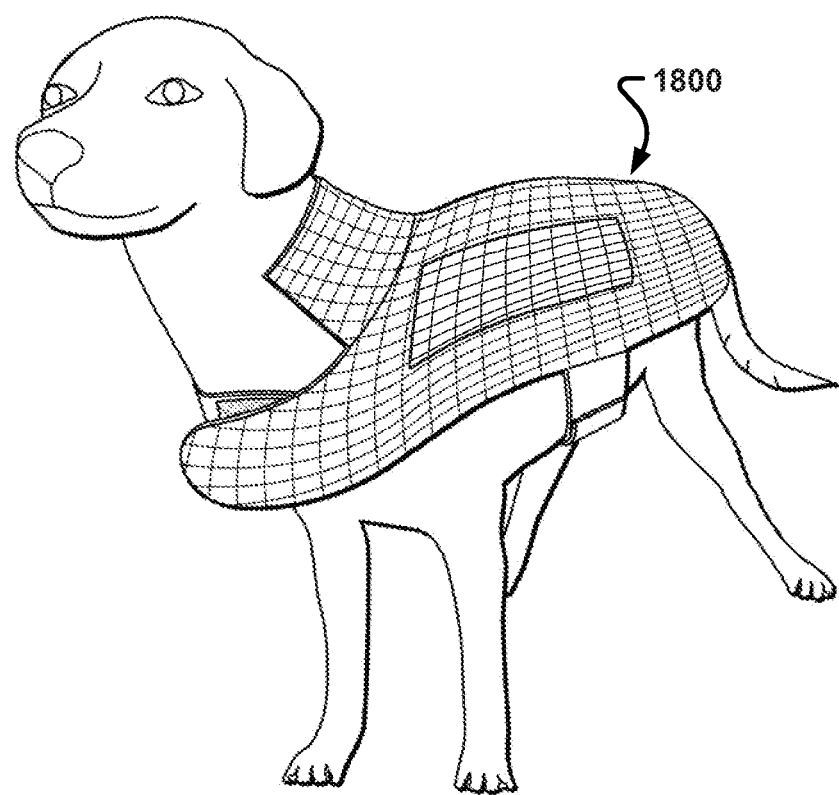
FIG. 23 is a perspective view of the fifth embodiment of a protective garment for an animal worn by an exemplary animal.

The side protector shields 1820, 1822 can be made from a metal, a metal alloy, a polymer, a ceramic, or a combination thereof. For example, the side protector shields 1820, 1822 can be made from iron, aluminum, copper, steel, stainless steel, bronze, polycarbonate, poly(methyl methacrylate), polyvinyl chloride, acrylic-polyvinyl chloride, silicon nitride, silicon carbide, or any combination thereof. When the side protector shields 1820, 1822 are installed on the central portion 1804 of the body 1802 of the protective garment 1800 and the protective garment 1800 is worn as shown in FIG. 23, the side protector shields 1820, 1822 can span the portion of the animal's body that is most likely to be grabbed by a predatory bird in the unlikely event that the pattern on the outer surface 1824 of the protective garment 1800 is unable to prevent the predatory bird from seeing the protective garment 1800 and the animal that is wearing the protective garment 1800, e.g., in a low light condition.

FIG. 20 shows that the outer surface 1856 of the side protector shields 1820, 1822 can include an array having a plurality of cells 1862 separated by a black, non-reflective grid 1864. Each of the plurality of cells 1862 can include an iridescent material that is patterned to shimmer in light in a manner that disorients and confuses a tetrachromatic bird of prey to render the animal wearing the protective garment 1800 and side protector shields 1820, 1822 substantially invisible to the bird of prey and substantially prevent the bird of prey from attacking the animal wearing the protective garment 1800 and side protector shields 1820, 1822. The pattern on the outer surface 1856 of the side protector shields 1820, 1822 is substantially the same as the pattern on the outer surface 1824 of the central portion 1804 of the body 1802 of the protective garment 1800. Moreover, the pattern on the outer surfaces 1856 of the side protector shields 1820, 1822 is designed so that when the side protector shields 1820, 1822 are properly installed on the protective garment 1800 the combination of the pattern on the outer surfaces 1856 of the side protector shields 1820, 1822 are substantially seamless, or substantially continuous, with the pattern on the outer surface 1824 of the central portion 1804 of the body 1802 of the protective garment 1800.

Each of the plurality of cells 1862 can have a two-dimensional shape that is triangular, circular, square, pentagonal, hexagonal, heptagonal, octagonal, nonagonal, decagonal, or a combination thereof. In another aspect, the outer surface 1856 of the side protector shields 1820, 1822 can include a plurality of individual cells applied to a black, non-reflective background, so that the black, non-reflective background appears to be a black, non-reflective grid 1864 separating each of the plurality of cells 1862. In a particular aspect, all of the cells 1862 can be the same size or the cells 1862 can be a mixture of sizes. Further, the cells 1862 can be uniform in shape or the cells 1862 can be a mixture of shapes. Additionally, the cells 1862 can be a uniform in shape and size or the cells 1862 can be a mixture of shapes and sizes. In still another aspect, a majority of the iridescent cells 1862 within the array of iridescent cells 1862 are substantially the same size. Further still, in another aspect, a majority of the iridescent cells 1862 within the array of iridescent cells 1862 are substantially the same shape. Moreover, in another aspect, at least a portion of the array of iridescent cells 1862 comprises a regular pattern of similarly sized and shaped iridescent cells 1862.

In another aspect, the black, non-reflective grid 1864 is non-iridescent and can have a light reflectance value (LRV) that can be less than or equal to 15.0%. Further, LRV can be less than or equal to 12.5% such as, less than or equal to 10.0%, less than or equal to 9.0%, less than or equal to 8.0%, or less than or equal to 7.5%. In another aspect, the LRV of the grid 1864 can be greater than or equal to 5.0%, such as greater than or equal to 5.75%, greater than or equal to 6.0%, greater than or equal to 6.25%, greater than or equal to 6.5%, greater than or equal to 6.75%, or greater than or equal to 7.0%. It is to be understood that the LRV of the grid 1864 can be within a range between, and including, any of the maximum and minimum values of LRV described herein.

Figure 24:
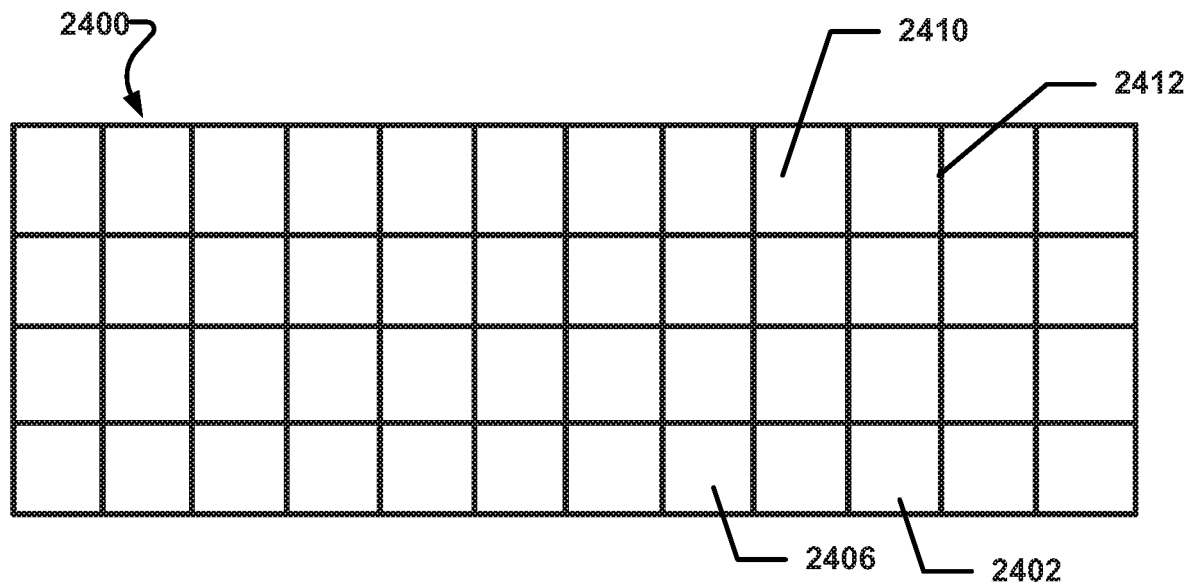
FIG. 24 is a side plan view of a third embodiment of a side protector shield for a protective garment for an animal.
Figure 25:
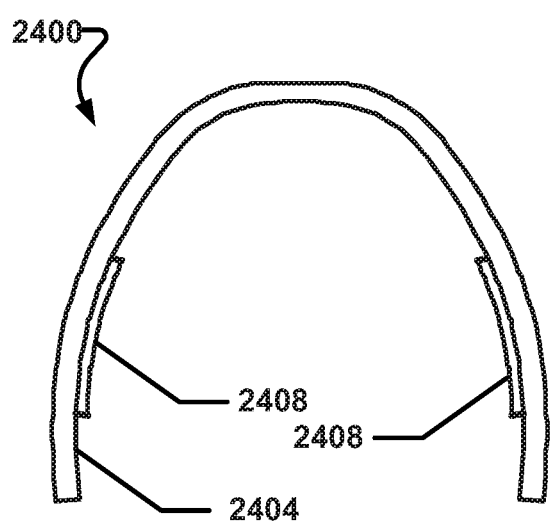
FIG. 25 is an end plan view of the third embodiment of a side protector shield for a protective garment for an animal.

Referring now to FIG. 24 and FIG. 25 a third embodiment of a side protector shield is shown and is generally designated 2400. The side protector shield 2400 can be installed on the protective garment 1800 described above. The side protector shield 2400 can have a body 2402 that has an inner surface 2404 and an outer surface 2406. Further, as shown in FIG. 25, the side protector shield 2400 is generally shaped like an upside down horseshoe and is designed to be worn like a saddle. FIGS. 24 and 25 also show that the side protector shield 2400 can include a plurality of fasteners 2408 that can removably engage the complimentary fasteners 1830, 1832, 1840, 1842 on the outer surface 1824 of the central portion 1804 of the body 1802 of the protective garment 1800 to establish breakaway connections that can breakaway, or disengage, under load, e.g., if an animal wearing the protective garment 1800 is picked up by a bird of prey via the protective garment 1800.

In a particular aspect, the fasteners 2408 can be snaps, Velcro®, or some other fastener that can be easily disengaged under a load. It is to be understood that the size of the Velcro®, e.g., the area thereof, may determine the load under which the fasteners 2408 can disengage and breakaway. Further, it is to be understood that the fasteners that connect the side flaps 1810, 1812 and collar slaps 1814, 1816 are substantially stronger than the fasteners 1840,

1842, 1844, 1846, 2408 that connect the side protector shield 2400 to the protective garment 1800. In a particular aspect, the fasteners that connect the side flaps 1810, 1812 and collar slaps 1814, 1816 are at least two times stronger than the fasteners 1840, 1842, 1844, 1846, 2408 that connect the side protector shield 2400 to the protective garment 1800. Further, the fasteners that connect the side flaps 1810, 1812 and collar slaps 1814, 1816 are at least three times stronger than the fasteners 1840, 1842, 1844, 1846, 2408 that connect the side protector shield 2400 to the protective garment 1800. Moreover, the fasteners that connect the side flaps 1810, 1812 and collar slaps 1814, 1816 are at least four times stronger than the fasteners 1840, 1842, 1844, 1846, 2408 that connect the side protector shield 2400 to the protective garment 1800.

For example, each breakaway connection can have a breakaway load, $L_B$, of less than or equal to 7.5 lbs. Moreover, the $L_B$ can be less than or equal to 6.0 lbs, such as less than or equal to 5.0 lbs, less than or equal to 4.0 lbs, less than or equal to 3.0 lbs, or less than or equal to 2.5 lbs. In another aspect, $L_B$, can be greater than or equal to 1.0 lbs, such as greater than or equal to 1.25 lbs, greater than or equal to 1.5 lbs, greater than or equal to 1.75 lbs, greater than or equal to 2.0 lbs, or greater than or equal to 2.25 lbs. It is to be understood that $L_B$ can be within a range between, and including, any of the maximum and minimum values of La described herein.

It is also to be understood that when a force, or load, is applied to the breakaway connection that is greater than $L_B$, the connectors used to establish the breakaway connection will disengage from each other and will allow the side protector shield 2400 to disengage from the central portion 1804 of the body 1802 of the protective garment 1800. As such, in the unlikely event that a bird of prey grasps an animal that is wearing the protective garment 1800, the bird of prey can fly away with the side protector shield 2400 while the animal wearing the protective garment 1800 remains on the ground.

Further, when installed, the side protector shield 2400 can provide a protection area, $A_P$, along the sides and top of the protective garment 1800. In a particular aspect, $A_P$ can be less than the total area, $A_T$, of the central portion 1804 of the body 1802 of the protective garment 1800 (not including the area of the flaps 1810, 1812, 1814, 1816). For example, $A_P$ can be less than or equal to 70% $A_T$. Further, $A_P$ can be less than or equal to 65% $A_T$, such as less than or equal to 60% $A_T$, less than or equal to 55% $A_T$, less than or equal to 50% $A_T$, less than or equal to 45% $A_T$, less than or equal to 40% $A_T$, or less than or equal to 35% $A_T$. In another aspect, $A_P$ can be greater than or equal to 20% $A_T$, such as greater than or equal to 25% $A_T$, or greater than or equal to 30% $A_T$. It is to be understood that $A_P$ can be within a range between, and including, any of the values of $A_P$ described herein.

The side protector shield 2400 can be made from a metal, a metal alloy, a polymer, a ceramic, or a combination thereof. For example, the side protector shield 2400 can be made from iron, aluminum, copper, steel, stainless steel, bronze, polycarbonate, poly(methyl methacrylate), polyvinyl chloride, acrylic-polyvinyl chloride, silicon nitride, silicon carbide, or any combination thereof. When the side protector shield 2400 is installed on the central portion 1804 of the body 1802 of the protective garment 1800 and the protective garment 1800 is worn by an animal, the side protector shield 2400 can span the portion of the animal's body that is most likely to be grabbed by a predatory bird in the unlikely event that the pattern on the outer surface 1824 of the protective garment 1800 is unable to prevent the predatory bird from seeing the protective garment 1800 and the animal that is wearing the protective garment 1800, e.g., in a low light condition.

FIG. 24 shows that the outer surface 2406 of the side protector shield 2400 can include an array having a plurality of cells 2410 separated by a black, non-reflective grid 2412. Each of the plurality of cells 2410 can include an iridescent material that is patterned to shimmer in light in a manner that disorients and confuses a tetrachromatic bird of prey to render the animal wearing the protective garment 1800 and side protector shield 2400 substantially invisible to the bird of prey and substantially prevent the bird of prey from attacking the animal wearing the protective garment 1800 and side protector shield 2400. The pattern on the outer surface 2406 of the side protector shield 2400 is substantially the same as the pattern on the outer surface 1824 of the central portion 1804 of the body 1802 of the protective garment 1800. Moreover, the pattern on the outer surface 2406 of the side protector shield 2400 is designed so that when the side protector shield 2400 is properly installed on the protective garment 1800 the combination of the pattern on the outer surface 2406 of the side protector shield 2400 is substantially seamless, or substantially continuous, with the pattern on the outer surface 1824 of the central portion 1804 of the body 1802 of the protective garment 1800.

Each of the plurality of cells 2410 can have a two-dimensional shape that is triangular, circular, square, pentagonal, hexagonal, heptagonal, octagonal, nonagonal, decagonal, or a combination thereof. In another aspect, the outer surface 2406 of the side protector shield 2400 can include a plurality of individual cells applied to a black, non-reflective background, so that the black, non-reflective background appears to be a black, non-reflective grid 2412 separating each of the plurality of cells 2410. In a particular aspect, all of the cells 2410 can be the same size or the cells 2410 can be a mixture of sizes. Further, the cells 2410 can be uniform in shape or the cells 2410 can be a mixture of shapes. Additionally, the cells 2410 can be a uniform in shape and size or the cells 2410 can be a mixture of shapes and sizes. In still another aspect, a majority of the iridescent cells 2410 within the array of iridescent cells 2410 are substantially the same size. Further still, in another aspect, a majority of the iridescent cells 2410 within the array of iridescent cells 2410 are substantially the same shape. Moreover, in another aspect, at least a portion of the array of iridescent cells 2410 comprises a regular pattern of similarly sized and shaped iridescent cells 2410.

In another aspect, the black, non-reflective grid 2412 is non-iridescent and can have a light reflectance value (LRV) that can be less than or equal to 15.0%. Further, LRV can be less than or equal to 12.5% such as, less than or equal to 10.0%, less than or equal to 9.0%, less than or equal to 8.0%, or less than or equal to 7.5%. In another aspect, the LRV of the grid 2412 can be greater than or equal to 5.0%, such as greater than or equal to 5.75%, greater than or equal to 6.0%, greater than or equal to 6.25%, greater than or equal to 6.5%, greater than or equal to 6.75%, or greater than or equal to 7.0%. It is to be understood that the LRV of the grid 2412 can be within a range between, and including, any of the maximum and minimum values of LRV described herein.

With the configuration of structure described herein, the various protective garments provide a wearable garment that can protect an animal wearing the garment from attacks by predatory birds. The pattern on the outer surface of the protective garment can shimmer in light in a manner that disorients and confuses a tetrachromatic bird of prey to render the animal wearing the protective garment substantially invisible to the bird of prey and substantially prevent the bird of prey from attacking the animal wearing the protective garment. In certain low light conditions, the outer surface of the protective garment may not properly shimmer. In such instances, the side protector shields may prevent a bird of prey from actually picking up the animal by preventing the talons of the animal from digging into the sides of the animal. In the event the talons of the predatory bird are able to engage the side protector shields, the shields may break away from the protective garment. Alternatively, the entire central portion of the body of the protective garment may break away from the protective garment. In such a case, the bird of prey may fly away with a portion of the protective garment while the animal remains safely on the ground.

Although the embodiments described above have been shown and described in considerable detail with respect to only a few exemplary embodiments thereof, it should be understood by those skilled in the art that it is not intended to be limited to these embodiments since various modifications, omissions and additions may be made to the disclosed embodiments without materially departing from the novel teachings and advantages. The directions in which the flaps are folded could differ from those shown and the lengths of the flaps may vary. For example, the flaps 18 and the short flap 16 could be of equal length or differ in length and fasten on top of the animal's back rather than on the underside. The collar 20 and/or the collar flaps 22 and 24 may be omitted. Accordingly, it is intended to cover all such modifications, omission, additions and equivalents as may be included within the spirit and scope of a pressure-applying garment and associated methods as defined by the following claims. What has been described and illustrated herein is an embodiment of the disclosure along with some of its variations. The terms, descriptions and figures used herein are set forth by way of illustration only and are not meant as limitations. Those skilled in the art will recognize that many variations are possible within the spirit and scope of the disclosure in which all terms are meant in their broadest, reasonable sense unless otherwise indicated. Any headings utilized within the description are for convenience only and have no legal or limiting effect.

While the disclosed subject matter has been described with respect to a limited number of embodiments, the specific features of one embodiment should not be attributed to other embodiments of the disclosed subject matter. No single embodiment is representative of all aspects of the disclosed subject matter. Moreover, variations and modifications therefrom exist. For example, the disclosed subject matter described herein may comprise other components. Various additives may also be used to further enhance one or more properties. In some embodiments, the disclosed subject matter is substantially free of any additive not specifically enumerated herein. Some embodiments of the disclosed subject matter described herein consist of or consist essentially of the enumerated components. In addition, some embodiments of the methods described herein consist of or consist essentially of the enumerated steps. The claims to be appended later intend to cover all such variations and modifications as falling within the scope of the disclosed subject matter.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A protective garment for an animal, the protective garment comprising:
    a body, the body comprising:
        a central portion;
        a first body flap extending from the central portion;
        a second body flap extending from the central portion opposite the first flap, wherein the first body flap and the second body flap are extendable around a body of the animal and fasten to each other;
        a first collar flap extending from central portion;
        a second collar flap extending from the central portion opposite the first collar flat, wherein the first collar flap and the second collar flap are extendable around a neck of the animal and fasten to each other; and
        wherein the central portion comprises an outer surface that comprises an array having a plurality of cells separated by a grid, wherein each of the plurality of cells comprises an iridescent material that shimmers in light in a manner that disorients and confuses a tetrachromatic bird of prey to render the animal wearing the protective garment substantially invisible to the bird of prey and substantially prevent the bird of prey from attacking the animal.

2. The protective garment of claim 1, further comprising a first side pocket extending at least partially along a length of the central portion of the body, wherein the first side pocket is established on a first side of the central portion of the body and wherein the first side pocket is accessible via an inner surface of the central portion of the body.

3. The protective garment of claim 2, further comprising a first side protector shield removably disposed within the first side pocket.

4. The protective garment of claim 3, further comprising a second side pocket extending at least partially along a length of the central portion of the body, wherein the second side pocket is established on a second side of the central portion of the body and wherein the second side pocket is accessible via an inner surface of the central portion of the body.

5. The protective garment of claim 4, further comprising a second side protector shield removably disposed within the second side pocket.

6. The protective garment of claim 5, wherein each of the first and second side protector shields has a length, $L_P$, and $L_P$ is less than an overall length, $L_O$, of the central portion of the body of the protective garment.

7. The protective garment of claim 5, wherein each of the first and second side protector shields comprises a plurality of segments coupled via a plurality of hinges.

8. The protective garment of claim 7, wherein each of the first and second side protector shields is bendable to conform to a shape of a body of the animal.

9. A protective garment for an animal, the protective garment comprising:
    a body, the body comprising:
        a central portion;
        a first body flap extending from the central portion;
        a second body flap extending from the central portion, wherein the first body flap and the second body flap are extendable around a body of the animal and fasten to each other;
        a first collar flap extending from central portion;
        a second collar flap extending from the central portion, wherein the first collar flap and the second collar flap are extendable around a neck of the animal and fasten to each other; and
        wherein the central portion comprises an outer surface that comprises an array having a plurality of cells separated by a grid, wherein each of the plurality of cells comprises an iridescent material that shimmers in light in a manner that disorients and confuses a bird of prey and substantially prevents the bird of prey from attacking the animal.

10. The protective garment of claim 9, wherein the first body flap and the second body flap are connected to the central portion of the body via breakaway joints.

11. The protective garment of claim 10, wherein the first collar flap and the second collar flap are connected to the central portion of the body via breakaway joints.

12. The protective garment of claim 11, wherein the breakaway joints are sewn joints.

13. The protective garment of claim 12, wherein the breakaway joints break apart under a breakaway load to allow the body flaps and collar flaps to disengage from the central portion of the body of the protective garment.

14. The protective garment of claim 13, wherein the breakaway load, $L_B$, of each breakaway joint is less than or equal to 7.5 lbs.

15. A protective garment for an animal, the garment comprising:
    a body, the body comprising:
        a central portion;
        a first body flap extending from the central portion;
        a second body flap extending from the central portion wherein the first body flap and the second body flap are extendable around a body of the animal and fasten to each other;
        a first collar flap extending from central portion;
        a second collar flap extending from the central portion, wherein the first collar flap and the second collar flap are extendable around a neck of the animal and fasten to each other; and
        wherein the central portion comprises an outer surface that comprises an array having a plurality of iridescent cells separated by a grid.

16. The protective garment of claim 15, further comprising a first side protector shield removable engaged with an outer surface of the central portion of the body of the protective garment.

17. The protective garment of claim 16, further comprising a second side protector shield removable engaged with an outer surface of the central portion of the body of the protective garment.

18. The protective garment of claim 17, further comprising at least one connector disposed on a first side of the outer surface of the central portion of the body of the protective garment and at least one connector disposed on an inner of the first side protector shield, wherein the connectors are removably engaged with each other to establish a breakaway connection.

19. The protective garment of claim 18, further comprising at least one connector disposed on a second side of the outer surface of the central portion of the body of the protective garment and at least one connector disposed on an inner of the second side protector shield, wherein the connectors are removably engaged with each other to establish a breakaway connection.

20. The protective garment of claim 19, wherein each of the first side protector shield and the second side protector shield comprises an outer surface that comprises an array having a plurality of iridescent cells separated by a black, non-reflective grid.

\* \* \* \* \*